United States Patent
Kanamori et al.

(10) Patent No.: US 6,790,914 B2
(45) Date of Patent: Sep. 14, 2004

(54) RESIN FILM AND APPLICATIONS THEREOF

(75) Inventors: Tarou Kanamori, Tokyo (JP); Kouji Kawahara, Tokyo (JP); Yuuichi Hashiguchi, Tokyo (JP); Yooichiroh Maruyama, Tokyo (JP); Noboru Oshima, Tokyo (JP)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 10/305,959

(22) Filed: Nov. 29, 2002

(65) Prior Publication Data

US 2004/0106740 A1 Jun. 3, 2004

(51) Int. Cl.[7] .............................................. C08L 45/00
(52) U.S. Cl. .................... 525/326.5; 525/342; 524/261; 430/270.1
(58) Field of Search .............................. 525/326.5, 342; 524/261; 430/270.1

(56) References Cited

U.S. PATENT DOCUMENTS

| | | | | | |
|---|---|---|---|---|---|
| 5,296,561 | A | * | 3/1994 | Babu et al. | 525/342 |
| 6,121,340 | A | * | 9/2000 | Shick et al. | 522/31 |
| 6,593,058 | B1 | * | 7/2003 | Feiring et al. | 430/270.1 |
| 6,635,700 | B2 | * | 10/2003 | Cruse et al. | 524/262 |
| 6,639,021 | B2 | * | 10/2003 | Oshima et al. | 525/326.5 |
| 2002/0042462 | A1 | | 4/2002 | Oshima et al. | 524/321 |

FOREIGN PATENT DOCUMENTS

| | | |
|---|---|---|
| CN | 1347939 | 5/2002 |
| EP | 1195397 A1 | 4/2002 |
| JP | 2003-48918 | 4/2002 |
| JP | 2002-114826 | 4/2002 |
| JP | 2002 226661 | 8/2002 |
| JP | 2002-327024 | 11/2002 |
| KR | 2002027217 | 4/2002 |

OTHER PUBLICATIONS

U.S. patent application Ser. No. 09/968,529, Oshima et al., filed Oct. 2, 2001.

U.S. patent application Ser. No. 10/305,959, Kanamori et al., filed Nov. 29, 2002.

U.S. patent application Ser. No. 10/241,578, Oshima et al., filed Sep. 12, 2002.

* cited by examiner

Primary Examiner—David W. Wu
Assistant Examiner—Henry S. Hu
(74) Attorney, Agent, or Firm—Oblon, Spivak, McClelland, Maier & Neustadt, P.C.

(57) ABSTRACT

A film for a display device produced by using a transparent (crosslinked) resin film formed of a composition including a cyclic olefin addition copolymer of the present invention has optical transparency, heat resistance, liquid crystal resistance, dimensional stability, and adhesion and is suitably used as an alternative to a glass substrate of a liquid crystal display device and an EL display device. The transparent (crosslinked) resin film can be used as a polarizing film, surface protective film, retardation film, transparent conductive film, light diffusion film, film for an EL display device, transparent conductive composite material, antireflection film, and the like.

22 Claims, No Drawings

RESIN FILM AND APPLICATIONS THEREOF

BACKGROUND OF THE INVENTION

1. Field of the Invention

The present invention relates to a resin film formed by using a composition comprising a cyclic olefin addition copolymer having an alkoxysilyl group and, optionally, an organosilane compound and/or a metal oxide.

The present invention also relates to a crosslinked resin film in which the cyclic olefin addition copolymer is crosslinked through siloxane bonds, and to a process for producing the crosslinked resin film.

The present invention further relates to a liquid crystal substrate film, a polarizing film, a surface protective film, a retardation film, a transparent conductive film, and a light diffusion film used for a liquid crystal display device and an electroluminescent (EL) display device which are obtained by using the (crosslinked) resin film which is excellent in optical transparency, heat resistance, hygroscopic resistance, liquid crystal resistance, dimensional stability, adhesion, and the like.

2. Description of Background Art

A liquid crystal display device and an EL display device excel in image quality, are thin and lightweight, and consume only a small amount of electric power. Therefore, these display devices are widely used for calculators, watches, portable telephones, personal computers, televisions, projectors, ATMs, display devices for vehicles such as car navigation systems, and the like. The liquid crystal display device and EL display device consist of various parts and materials. As examples of parts and materials for the liquid crystal display device, a liquid crystal, liquid crystal alignment film, liquid crystal substrate, transparent electrode, color filter, polarizing film, light guiding plate, transparent conductive film, retardation film, surface protective film, light diffusion film, prism sheet, spacer, sealant, and the like can be given. The liquid crystal display device is manufactured by assembling these parts and materials and installing module parts such as a driver IC, printed board, and backlight. As examples of parts and materials for the EL display device, an electroluminescent (EL) element, polarizing film, retardation film, transparent electrode, and the like can be given. The EL display device are manufactured by assembling these parts and materials.

Conventionally, a glass substrate has been mainly used as the liquid crystal substrate. However, since glass has low mechanical strength, it is difficult to decrease the thickness of the display device. Moreover, since the glass substrate lacks flexibility, the degree of freedom relating to the shape of the substrate is limited. Furthermore, occurrence of cracks in the glass substrate results in a decrease in productivity. In recent years, portable equipment such as portable information terminals including portable telephones, notebook type personal computers, and sub-notebook type personal computers has been widely used. A liquid crystal display device and a liquid crystal substrate used for this type of equipment must be lightweight and thin, and must not crack. Therefore, a liquid crystal substrate film formed of a transparent resin is used for a liquid crystal display device for which these properties are important instead of a glass substrate. In the case of using a glass substrate, an alignment film applied to the substrate is sintered at a high temperature of 200° C. or more. However, heat resistance of a liquid crystal substrate film made of polyethersulfone (PES), which is a transparent resin and widely used in this application, is as low as 160 to 170° C. Therefore, a transparent resin film having higher heat resistance has been demanded.

A polarizing film divides incident light into two polarized components which intersect each other. The polarizing film allows one of the two polarized components to pass through, and absorbs or disperses the other component. As the polarizing film, a polyvinyl alcohol film in which the molecules are oriented in a uniform direction and a dichromatic substance such as iodine or a pigment is absorbed thereon has been used, for example. However, such a polarizing film has insufficient mechanical strength in the direction of the transmission axis, and shrinks due to heat or moisture. Therefore, surface protective films are provided on each side of the polarizing film as protective layers.

The surface protective film must have low birefringence, high heat resistance, low hygroscopicity, high mechanical strength, excellent surface smoothness, high resolution, excellent adhesion to a tackifier, and the like. Conventionally, a triacetyl cellulose (TAC) film, which is produced by using a casting method and has low birefringence and excellent surface smoothness, has been used as the surface protective film. However, durability, heat resistance, mechanical strength, birefringence, and adhesion to a tackifier of the TAC film is insufficient at a high temperature and high humidity. Therefore, a material having higher heat resistance and the like has been demanded.

A retardation film is used in an STN (super-twisted nematic) liquid crystal display device to compensate for wavelength dependent coloration of the refractive index occurring when twisting liquid crystal molecules. The retardation film must have uniform birefringence over the entire surface and show no change in optical characteristics, even under severe conditions at a high temperature and high humidity, in order to obtain a vivid color and a high-resolution image. In the liquid crystal display device, the retardation film is layered on the polarizing film through an adhesive layer. As the retardation film, a film obtained by stretching and orienting a polycarbonate (PC) film is generally used. However, since the PC film has a large photoelastic coefficient of $9 \times 10^{-12}$ cm$^2$/dyn, birefringence of the PC film is excessively increased, becomes nonuniform, or is changed due to only a small amount of stress applied when assembling or due to environmental changes. Moreover, the PC film causes problems when forming the film or assembling the device due to low surface hardness. Therefore, a material capable of replacing the PC film has been demanded.

A transparent conductive film has a structure in which a transparent conductive film is layered on a transparent film substrate. The transparent film substrate must excel in heat resistance, surface smoothness, optical characteristics, and moisture resistance. Conventionally, polyethersulfone (PES) or polyarylate (PAR) has been used as the transparent film substrate. However, the PES film has inferior transparency and the PAR film tends to cause optical distortion to occur. Therefore, a complicated technique is necessary for obtaining a transparent and optically uniform film.

A light diffusion film is layered on the backlight of the liquid crystal display in order to diffuse light or improve brightness. The light diffusion film is generally formed by forming a fine pattern on the surface of a transparent sheet or film by means of embossing or applying a photocurable resin. As the substrate for the light diffusion film, PC or polyethyleneterephthalate (PET) is generally used. However, since the PC film may be easily damaged due to low surface hardness, transparency of the film may be impaired in the case where the film is damaged when forming a fine pattern or assembling the display device. Moreover, since the PET film has insufficient transparency, a liquid crystal display device manufactured by using the PET film lacks brightness, whereby image quality may be impaired. Moreover, since the PET film has insufficient heat resistance, it is difficult to form a uniform fine pattern due to occurrence of warping of the film.

A prism sheet is used to improve brightness of the liquid crystal display device by collecting light diffused through the light diffusion film at the an angle of view of the liquid crystal display device. The prism sheet is used for a large-sized color STN display and color TFT display. As the substrate for the prism sheet, a PC film is generally used. However, further improvement of brightness of the liquid crystal display device by improving optical nonuniformity and increasing light transmissivity has been demanded.

Various types of films having a thickness of about 10 to 500 μm used for the liquid crystal display device and the EL display device are produced by using a transparent resin having properties necessary for each film. As the transparent resin, an acrylic resin such as polymethylmethacrylate (PMMA), a polycarbonate (PC) resin, a polyethyleneterephthalate (PET) resin, a polyethersulfone (PES) resin, and a polyarylate (PAR) resin have been used. However, the PC resin and the polyester resin have high birefringence. The acrylic resin exhibits insufficient heat resistance and moisture resistance. The PES film has a heat resistance as low as 160 to 170° C.

As a substrate film for an antireflection film, a film formed of a transparent resin such as PET, PC, and PMMA has been used. The antireflection film formed on the substrate film may be either a single-layer film or a multi-layer film. Reflection of light can be prevented over a broader wavelength range by increasing the number of layers. However, an increase in the number of layers results in a decrease in transparency. Therefore, transparency of the substrate is particularly demanded. The antireflection film is generally used for displays. If the antireflection film has high birefringence, it is difficult to obtain a fine image due to distortion of the image or the like. Therefore, a uniform antireflection film having low birefringence over the entire film has been demanded.

As a material for optical parts such as a plastic substrate material, the following hydrogenated products of a ring-opening polymer and addition polymers have been proposed.

(1) Hydrogenated product of ring-opening polymer (1-1) Hydrogenated product of ring-opening copolymer of tetracyclododecene compound (Japanese Patent Application Laid-open No. 60-26024 and Japanese Patent No. 3050196)

(1-2) Hydrogenated product of ring-opening copolymer of norbornene or tetracyclododecene compound containing ester group (Japanese Patent Application Laid-open No. 1-132625 and Japanese Patent Application Laid-open No. 1-132626)

(2) Addition polymer (2-1) copolymer of ethylene and norbornene compound or tetracyclododecene compound (Japanese Patent Application Laid-Open No. 61-292601 and Makromol. Chem. Macromol. Symp. Vol. 47, 83 (1991))

(2-2) Addition polymer of norbornene and addition copolymer of norbornene and alkyl-substituted norbornene (B. L. Goodall et al., MetCon 97, Jun. 4–5, 1997, Japanese Patent Application Laid-Open No. 4-63807, and Japanese Patent Application Laid-Open No. 8-198919)

(2-3) Addition polymer of carboxylate of norbornene, addition copolymer of norbornene and carboxylate of norbornene, addition polymer of norbornene and carboxylic acid (Macromolecule, Vol. 29, 2755 (1996), Macromol. Rapid. Commun. Vol. 19, 251 (1998), WO96/37526)

However, the hydrogenated products of a ring-opening copolymer of (1-1) and (1-2) have the following problems. Specifically, since a ring-opening copolymer has a glass transition temperature lower than that of an addition polymer even if the monomers are the same, it is difficult to obtain a polymer having a high glass transition temperature. Moreover, since it is difficult to completely hydrogenate a ring-opening copolymer, the hydrogenated product of a ring-opening copolymer contains a small amount of unsaturated bonds. As a result, the hydrogenated product may be colored when forming a thin film, film, or sheet at a high temperature of 250° C. or more, thereby resulting in insufficient heat resistance.

In the copolymer of ethylene and a norbornene compound or a tetracyclododecene compound of (2-1), since the repeating units from ethylene are distributed, the copolymer is crystallized if the repeating units from ethylene are long, whereby optical transparency may become insufficient. Moreover, since the copolymer does not contain a polar group, adhesion of the copolymer is insufficient.

The addition polymer of (2-2) has high heat resistance due to a high glass transition temperature. However, this addition polymer has insufficient solvent resistance. The addition polymer of a carboxylate of norbornene, the addition copolymer of norbornene and a carboxylate of norbornene, and the addition polymer of norbornene and carboxylic acid of (2-3) excel in adhesion due to a large content of a polar group. However, these homo-polymers and copolymers have insufficient hygroscopic resistance and lack dimensional stability.

As a result of extensive studies, the present inventors have found that a substrate for forming a liquid crystal alignment film used for a liquid crystal display excelling in heat resistance, solvent resistance, dimensional stability, and transparency is obtained by using a crosslinked product of a cyclic olefin addition copolymer having a specific structure. This finding has led to the completion of the present invention.

Accordingly, an object of the present invention is to provide a film for a liquid crystal display device and an EL display device using a novel resin instead of resins conventionally used as a film for display devices such as a cyclic olefin copolymer (ring-opening polymer) resin, polycarbonate (PC) resin, triacetylcellulose (TAC) resin, polyethersulfone (PES) resin, and polyethyleneterephthalate (PET) resin. Another object of the present invention is to provide a substrate film, a polarizing film, a surface protective film, a retardation film, a transparent conductive film, and a light diffusion film used for a liquid crystal display device, which are obtained by using the resin film of the present invention.

SUMMARY OF THE INVENTION

The present invention provides a resin film obtained by forming a composition comprising a cyclic olefin addition copolymer which comprises a repeating unit (a) shown by the following formula (1),

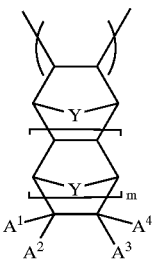

(1)

wherein $A^1$ to $A^4$ individually represent a hydrogen atom, a hydrocarbon group having 1–20 carbon atoms, or an alkoxysilyl group or an aryloxysilyl group shown by —$(CR^1R^2)_f Si(OR^3)_g R^4_{(3-g)}$, —$(CR^1R^2)_f Si(R^3R^4)OSi(OR^3)_g R^4_{(3-g)}$, or —$(CR^1R^2)_f C(O)O(CH_2)_h Si(OR^3)_g R^4_{(3-g)}$ (wherein $R^1$ and $R^2$ individually represent a hydrogen atom or a hydrocarbon group having 1–20 carbon atoms, $R^3$ represents an alkyl group, alkenyl group, aryl group, or cycloalkyl group, each having 1–10 carbon atoms, $R^4$ is a hydrogen atom, a halogen atom, or a hydrocarbon group having 1–20 carbon atoms, f and h are integers of 0–5, and g is an integer of 1–3), provided that at least one of $A^1$ to $A^4$ represents the alkoxysilyl group or aryloxysilyl group, Y represents —$CH_2$— or —O—, and m is either 0 or 1, and a repeating unit (b) shown by the following formula (2),

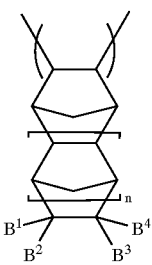

(2)

wherein $B^1$ to $B^4$ individually represent a hydrogen atom, an alkyl group, aryl group, alkenyl group, or cycloalkyl group, each having 1–20 carbon atoms, a halogen atom, a halogenated hydrocarbon group, or a polar group shown by —$(CH_2)_j X$, (wherein X represents —$C(O)OR^5$ or —$OC(O)R^6$ (wherein $R^5$ and $R^6$ represent an alkyl group, alkenyl group, aryl group, cycloalkyl group, each having 1–20 carbon atoms, or a halogen-substituted group of these groups), and j is an integer of 0–5), $B^1$ and $B^2$ or $B^3$ and $B^4$ may form an alkylidenyl group, $B^1$ and $B^4$, $B^1$ and $B^3$, or $B^2$ and $B^4$ may form a cycloalkylene group or a cycloalkenylene group, and n is an integer of 0–2.

The present invention also provides a crosslinked resin film obtained by crosslinking the cyclic olefin addition copolymer through siloxane bonds.

A compound (A) which is at least one compound selected from the group consisting of an organosilane shown by the following formula (3), a hydrolyzate of the organosilane, and a condensation product of the organosilane (hereinafter may be referred to as "organosilanes"), or a compound (B) which is at least one metal oxide selected from the group consisting of silica, alumina, zirconia, and titania may be added to the (crosslinked) resin film of the present invention.

$$(R^7)_p Si(OR^8)_{4-p} \quad (3)$$

wherein $R^7$ individually represents an organic group having 1–10 carbon atoms, $R^8$ individually represents an alkyl group having 1–5 carbon atoms or an acyl group having 1–6 carbon atoms, and p is an integer of 0–2.

At least one compound of a metal selected from the group consisting of Al, Zr, Sn, Zn, Ca, Ba, Ti, Sc, Gd, Yb, Sm, Nd, Sb, Y, and Ce may be added to the (crosslinked) resin film of the present invention as a catalyst in order to allow an additional compound such as the organosilanes and the metal oxide to be graft bonded to the cyclic olefin addition copolymer during or before casting.

The present invention further provides a process for producing the resin film comprising a step of mixing the above composition with an organic solvent to prepare a solution, and a step of forming the solution into a film by using a solution casting method.

The present invention further provides a process for producing a crosslinked film comprising forming the cyclic olefin addition copolymer composition into a film by using a solution casting method, and crosslinking the cyclic olefin addition copolymer through siloxane bonds by heating the film at 50° C. or more or heating the film in the presence of hot water or vapor.

The (crosslinked) resin film of the present invention is suitably used as a film for a liquid crystal display device and an EL display device.

The (crosslinked) resin film of the present invention is suitably used as a liquid crystal substrate film, a polarizing film, a surface protective film, a retardation film, a transparent conductive film, a light diffusion film, and an antireflection film for a liquid crystal display device.

Other objects, features and advantages of the invention will hereinafter become more readily apparent from the following description.

DETAILED DESCRIPTION OF THE INVENTION AND PREFERRED EMBODIMENT

The resin film of the present invention useful as a film for a display device is obtained by forming a composition comprising a cyclic olefin addition copolymer which comprises a repeating unit (a) shown by the above formula (1) and a repeating unit (b) shown by the above formula (2). The crosslinked resin film is obtained by crosslinking the cyclic olefin addition copolymer through siloxane bonds.

The repeating unit (a) used in the cyclic olefin addition copolymer of the present invention is formed by addition polymerization of acyclic olefin shown by the following formula (1)' (hereinafter may be referred to as "specific cyclic olefin (1)"):

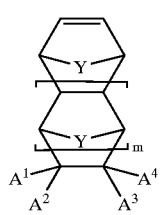

(1)' wherein $A^1$ to $A^4$, Y, and m are the same as defined for the formula (1).

As specific examples of the specific monomer (1), 5-trimethoxysilyl-2-norbornene, 5-trimethoxysilyl-7-oxa-2-norbornene, 5-dimethoxychlorosilyl-2-norbornene, 5-dimethoxychlorosilyl-7-oxa-2-norbornene, 5-methoxychloromethylsilyl-2-norbornene, 5-dimethoxychlorosilyl-2-norbornene, 5-methoxyhydridomethylsilyl-2-norbornene, 5-dimethoxyhydridosilyl-2-norbornene, 5-methoxydimethylsilyl-2-norbornene, 5-triethoxysilyl-2-norbornene, 5-triethoxysilyl-7-oxa-2-norbornene, 5-diethoxychlorosilyl-2-norbornene, 5-ethoxychloromethylsilyl-2-norbornene, 5-diethoxyhydridosilyl-2-norbornene, 5-ethoxydimethylsilyl-2-norbornene, 5-ethoxydiethylsilyl-7-oxa-2-norbornene, 5-propoxydimethylsilyl-2-norbornene, 5-tripropoxysilyl-2-norbornene, 5-triphenoxysilyl-2-norbornene, 5-trimethoxysilylmethyl-2-norbornene, 5-(2-trimethoxysilyl)ethyl-2-norbornene, 5-(2-dimethoxychlorosilyl)ethyl-2-norbornene, 5-(1-trimethoxysilyl)ethyl-2-norbornene, 5-(2-trimethoxysilyl)propyl-2-norbornene, 5-(1-trimethoxysilyl)propyl-2-norbornene, 5-triethoxysilylethyl-7-oxa-2-norbornene, 5-dimethoxymethylsilylmethyl-2-norbornene, 5-trimethoxypropylsilyl-2-norbornene, 5-triethoxysiloxydimethylsilyl-2-norbornene, 8-triethoxysilyl-3-tetracyclo[4.4.0.1$^{2,5}$.1$^{7,10}$]dodecene, 8-methyldimethoxysilyl-3-tetracyclo[4.4.0.1$^{2,5}$.1$^{7,10}$]dodecene, 8-triethoxysiloxydimethylsilyl-3-tetracyclo[4.4.0.1$^{2,5}$.1$^{7,10}$]dodecene, 5-trimethoxysiloxy-dimethylsilyl-2-norbornene, 5-triethoxysiloxy-dimethylsilyl-2-norbornene, 5-methyldimethoxysiloxy-dimethylsilyl-2-norbornene, trimethoxysilylpropyl-5-norbornene-2-carboxylate, triethoxysilylpropyl-5-norbornene-2-carboxylate, dimethoxymethylsilylpropyl-5-norbornene-2-carboxylate, trimethoxysilylpropyl-2-methyl-5-norbornene-2-carboxylate, triethoxysilylpropyl-2-methyl-5-norbornene-2-carboxylate, dimethoxymethylsilylpropyl-5-methyl-5-norbornene-2-carboxylate, and the like can be given.

The content of the repeating unit (a) in the cyclic olefin addition copolymer is 0.2–30 mol %, preferably 0.5–20 mol %, and still more preferably 1.0–10 mol %. If the content of the repeating unit (a) in the cyclic olefin addition copolymer is less than 0.2 mol %, it is difficult to form a crosslinked product. If the content exceeds 30 mol %, hygroscopic resistance and dimensional stability may be decreased.

As another method of forming the repeating unit (a) shown by the formula (1), a method of subjecting a cyclic olefin having a trichlorosilyl group or a dichloroalkylsilyl group (hereinafter referred to as "specific cyclic olefin (2)") to addition copolymerization, and reacting the trichlorosilyl group or dichloroalkylsilyl group in the resulting copolymer with an alkoxide compound or aryloxide compound of an alkali metal, or reacting the trichlorosilyl group or dichloroalkylsilyl group with an alcohol or a phenol in the presence of an amine compound can be given.

As specific examples of the specific cyclic olefin (2), 5-trichlorosilyl-2-norbornene, 5-trichlorosilyl-7-oxa-2-norbornene, 5-dichloromethylsilyl-2-norbornene, 5-dichloroethylsilyl-2-norbornene, trichlorosilylpropyl-5-norbornene-2-carboxylate, trichlorosilylpropyl-2-methyl-5-norbornene-2-carboxylate, dichloromethylsilylpropyl-5-norbornene-2-carboxylate, and the like can be given.

In the cyclic olefin addition copolymer of the present invention, the repeating unit (b) shown by the formula (2), which is used together with the repeating unit (a) shown by the formula (1), is formed by addition polymerization of a cyclic olefin shown by the following formula (2)' (hereinafter referred to as "specific cyclic olefin (3)"):

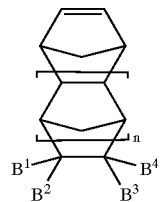

(2)' wherein $B^1$ to $B^4$ and n are the same as defined for the formula (2).

As specific examples of the specific cyclic olefin (3), 2-norbornene, 5-methyl-2-norbornene, 5-ethyl-2-norbornene, 5-propyl-2-norbornene, 5-butyl-2-norbornene, 5-pentyl-2-norbornene, 5-hexyl-2-norbornene, 5-heptyl-2-norbornene, 5-octyl-2-norbornene, 5-decyl-2-norbornene, 5-dodecyl-2-norbornene, 5-vinyl-2-norbornene, 5-allyl-2-norbornene, 5-butenyl-2-norbornene, 5-methylidene-2-norbornene, 5-ethylidene-2-norbornene, 5-isopropylidene-2-norbornene, 5,6-dimethyl-2-norbornene, 5-methyl-2-norbornene, 5-ethyl-2-norbornene, 5,6-benzo-2-norbornadiene, 5-phenyl-2-norbornene, 2,5-norbornadiene, 5-methyl-2,5-norbornadiene, 5-cyclohexyl-2-norbornene, 5-fluoro-2-norbornene, 5-chloro-2-norbornene, methyl 5-norbornene-2-carboxylate, ethyl 5-norbornene-2-carboxylate, butyl 5-norbornene-2-carboxylate, methyl 2-methyl-5-norbornene-2-carboxylate, ethyl 2-methyl-5-norbornene-2-carboxylate, propyl 2-methyl-5-norbornene-2-carboxylate, butyl 2-methyl-5-norbornene-2-carboxylate, methyl 2-ethyl-5-norbornene-2-carboxylate, trifluoroethyl 2-methyl-5-norbornene-2-carboxylate, ethyl 2-methyl-5-norbornen-2-yl acetate, 5-norbornene-2-spiro-N-phenylsuccinimide, 5-norbornene-2-spiro-N-cyclohexylsuccinimide, 5-norbornene-2-spiro-N-methylsuccinimide, 5-norbornene-2,3-N-phenyldicarboxyimide, 5-norbornene-2,3-N-cyclohexyldicarboxyimide, 2-methyl-5-norbornenyl acrylate, 2-methyl-5-norbornenyl methacrylate, dimethyl 5-norbornene-2,3-dicarboxylate, diethyl 5-norbornene-2,3-dicarboxylate, 3-tricyclo[4.3.0.1$^{2,5}$]decene, 3,7-tricyclo[4.3.0.1$^{2,5}$]decadiene(dicyclopentadiene), 3-tetracyclo[4.4.0.1$^{2,5}$.1$^{7,10}$]dodecene, 8-methyl,3-tetracyclo[4.4.0.1$^{2,5}$.1$^{7,10}$]dodecene, 8-ethylidene-3-tetracyclo[4.4.0.1$^{2,5}$.1$^{7,10}$]dodecene, 8-methyl-8-methoxycarbonyl-3-tetracyclo[4.4.0.1$^{2,5}$.1$^{7,10}$]dodecene, 8-methyl-8-ethoxycarbonyl-3-tetracyclo[4.4.0.1$^{2,5}$.1$^{7,10}$]dodecene, and the like can be given.

The compound shown by the formula (2)' used to form the repeating unit (b) may be used either individually or in combination of two or more.

The content of the repeating unit (b) in the cyclic olefin addition copolymer of the present invention is 70 to 99.8 mol %, preferably 80 to 99.5 mol %, and still more preferably 90 to 99 mol % of the total repeating unit. If the content of the repeating unit (b) is less than 70 mol %, the glass transition temperature may be decreased. If the content exceeds 99.8 mol %, it is difficult to crosslink the copolymer.

The repeating unit (a) shown by the formula (1) may be formed by modifying the specific cyclic olefin shown by the formula (2)'. For example, the repeating unit (a) maybe formed by subjecting at least one compound selected from the group consisting of a norbornadiene compound, a compound having an alkenyl substituent, and a compound having a vinylidenyl substituent (hereinafter referred to as "specific cyclic olefin (4)") to addition copolymerization, and subjecting an unsaturated double bond in the resulting copolymer to hydrosilylation with an alkoxysilane compound having an Si—H bond in the presence of a catalyst such as a Pt compound, Rh compound, or Ru compound.

As specific examples of the specific cyclic olefin (4), 2,5-norbornadiene, 7-oxa-2,5-norbornadiene, 5-methyl-2,5-norbornadiene, 5-vinyl-2-norbornene, 5-vinyl-7-oxa-2-norbornene, 5-allyl-2-norbornene, 5-butenyl-2-norbornene, 5-methylidene-2-norbornene, 5-ethylidene-2-norbornene, 5-ethylidene-7-oxa-2-norbornene, 5-isopropylidene-2-norbornene, 8-ethylidene-3-tetracyclo[$4.4.0.1^{2,5}.1^{7,10}$] dodecene, and the like can be given.

As specific examples of alkoxysilane compounds having an Si—H bond, trimethoxysilane, triethoxysilane, tripropoxysilane, dimethoxysilane, diethoxysilane, dimethoxychlorosilane, diethoxychlorosilane, dimethoxymethylsilane, diethoxymethylsilane, dimethoxyphenylsilane, diethoxyphenylsilane, monomethoxydimethylsilane, monoethoxydimethylsilane, monoethoxydiethylsilane, and the like can be given.

As a hydrosilylation catalyst, $H_2PtCl_6 \cdot H_2O$, $Pt/Al_2O_3$, $RhCl(PPh_3)_2$, $Rh/Al_2O_3$, $RuCl_3$, $IrCl_3$, $FeCl_3$, $AlCl_3$, $PdCl_2 \cdot 2H_2O$, $NiCl_2$, $TiCl_4$, and the like can be given.

As a polymerization catalyst used for copolymerizing the cyclic olefin addition copolymer of the present invention, multicomponent catalysts 1), 2), and 3) given below may be used.

1) Transition Metal Compound

As examples of transition metal compounds, superacid modified compounds such as a compound selected from an organic carboxylate, organic phosphite, organic phosphate, organic sulfonate, and β-diketone compound of nickel or cobalt, and superacid modified organic carboxylate of nickel or cobalt by a superacid compound selected from antimony hexafluoride, boron tetrafluoride, trifluoroacetic acid, and acetone hexafluoride; complexes having a bidentate ligand or a tridentate ligand such as complexes in which a diene or triene is coordinated to nickel such as a 1,5-cyclooctadiene complex of nickel, [($\eta^3$-crotyl)Ni(cyclooctadiene)] [$B((CF_3)_2C_6H_4)_4$], a cyclododecatriene complex of nickel, and a norbornadiene complex of nickel, a bis (triarylphosphine)dihalogen complex of nickel or cobalt, [($\eta$3-crotyl)Ni(cyclooctadiene)] [$B((CF_3)_2C_6H_4)_4$], bis[N-(3-tert-butylsalicylidene)phenylaminato]Ni, Ni[PhC(O)CHPPh$_2$] (Ph) (PPh$_3$), Ni[OC(O) (C$_6$H$_4$)PPh$_2$) (H) (PCy$_3$), Ni[OC(O)(C$_6$H$_4$)PPh$_2$] (H) (PPh$_3$), a reaction product of Ni(COD)$_2$ and PPh$_3$=CHC(O)Ph, and [(ArN=CHC$_6$H$_3$(O)(Anth)] (Ph) (PPh$_3$)Ni (Ar: 2,6-(Pr)$_2$C$_6$H$_3$, Pr: isopropyl, Anth: 9-anthracene, Ph: phenyl, Cy: Cyclohexyl, COD: 1,5-cyclooctadien), and the like can be given.

2) Organoaluminum Compound

As examples of organoaluminum compounds, methylalumoxane, ethylalumoxane, butylalumoxane, methylalumoxane in which trialkylaluminum is partially mixed, trimethylaluminum, triethylaluminum, triisobutyl aluminum, diisobutylaluminum hydride, diethylaluminum chloride, ethylaluminum sesquichloride, ethylaluminum dichloride, and the like can be given.

3) Compound Added to Improve Polymerization Activity

As examples of compounds which can be added to improve polymerization activity, Lewis acid compounds such as a non-conjugated diene compound such as 1,5-cyclooctadiene and 1,5,9-cyclododecatriene, a complex of boron trifluoride with an ether, amine, phenol, or the like, tri(pentafluorophenyl)borane, tri(3,5-di-trifluoromethylphenyl)borane, and tri (pentafluorophenyl) aluminum; ionic boron compounds such as triphenylcarbenium tetrakis(pentafluorophenyl)borate, triphenylcarbenium tetrakis(3,5-di-trifluoromethylphenyl)borate, tributylammonium tetrakis(pentafluorophenyl)borate, N,N-dimethylanilinium tetrakis(pentafluorophenyl)borate, and N,N-diethylanilinium tetrakis(pentafluorophenyl)borate; and the like can be given.

The catalyst component is used in an amount given below. Specifically, the nickel compound or cobalt compound is used in an amount of 0.02 to 100 mmol atom for one mol of the monomers. The organoaluminum compound is used in an amount of 1 to 5000 mol for one mol atom of nickel or cobalt. The non-conjugated diene, Lewis acid compound, and ionic boron compound are used in an amount of 0.2 to 100 mol for one mol atom of nickel or cobalt.

As a solvent for polymerization of the cyclic olefin addition copolymer of the present invention, one or more solvents selected from aliphatic hydrocarbons such as pentane, hexane, heptane, butane, and 2-methylbutane, alicyclic hydrocarbons such as cyclohexane, cyclopentane, and methylcyclopentane, aromatic hydrocarbons such as toluene, benzene, xylene, and mesitylene, halogenated hydrocarbons such as dichloromethane, 1,2-dichloroethane, chlorobenzene, o-dichlorobenzene, and polar solvents such as ethyl acetate, butyl acetate, γ-butyrolactone, and nitromethane may be used.

A process for preparing the cyclic olefin addition copolymer of the present invention is illustrated below. However, the present invention is not limited thereto.

A reaction vessel is charged with a solvent, cyclic olefin monomers, and a molecular weight modifier in a nitrogen or argon atmosphere. The polymerization system is set at −20° C. to 100° C.

After the addition of the catalyst components, the monomers are polymerized at −20 to 100° C. The weight ratio of the solvent to the monomers is 1 to 20. The target molecular weight of the copolymer is adjusted by changing the amount of polymerization catalyst, the amount of molecular weight modifier such as an α-olefin, hydrogen, or diphenyldihydrosilane, the rate of conversion into the polymer, and a polymerization temperature. The polymerization is terminated by the addition of a compound selected from water, an alcohol, an organic acid, and carbon dioxide. Catalyst residues are separated and removed from the polymer solution by adding a water-alcohol mixture of an acid such as maleic acid, fumaric acid, or oxalic acid to the polymer solution. The polymer is obtained by placing the polymer solution in an alcohol selected from methanol, ethanol, and isopropanol to coagulate the polymer, and drying the polymer under reduced pressure. Unreacted monomers remaining in the polymer are removed in this step.

The polystyrene-reduced number average molecular weight of the cyclic olefin addition copolymer of the present invention, measured by gel permeation chromatography using o-dichlorobenzene as a solvent, is preferably 10,000 to 1,000,000, and still more preferably 50,000 to 500,000. The polystyrene-reduced weight average molecular weight of the cyclic olefin addition copolymer is preferably 15,000 to 1,500,000, and still more preferably70,000 to 700,000. If the polystyrene-reduced number average molecular weight is less than 10,000 and the polystyrene-reduced weight average molecular weight is less than 15,000, breaking strength may be insufficient. If the polystyrene-reduced number average molecular weight exceeds 1,000,000 and the polystyrene-reduced weight average molecular weight exceeds 1,500,000, viscosity of the polymer solution is increased when producing a sheet or film by casting a solution of the cyclic olefin addition copolymer, whereby it becomes difficult to obtain a flat and smooth sheet or film which shows neither waving nor warping.

The glass transition temperature (Tg) of the cyclic olefin addition copolymer of the present invention thus obtained is preferably 200° C. or more, and still more preferably 250 to 400° C. If the glass transition temperature is less than 200° C., deformation may occur due to thermal load applied during crosslinking.

The crosslinking reaction of the resin film including the cyclic olefin addition copolymer of the present invention progresses in the presence of an acid catalyst. As the acid catalyst, at least one compound selected from compounds which generate an acid by thermal decomposition and compounds which generate an acid by hydrolysis in the presence of hot water or vapor may be used. The temperature at which the thermal decomposition or hydrolysis progresses is 50° C. or more, preferably 80° C. or more, and still more preferably 100° C. or more.

As examples of the compounds which generate an acid (acid generator) by thermal decomposition, benzylsulfonium salt, benzylammonium salt, benzylphosphonium salt, hydradinium salt, and the like can be given.

As examples of the compounds which generate an acid by hydrolysis, a phosphite, hypophosphite, iminophosphonate, organic carboxylate, organic sulfonate, organic sulfinate, and the like can be given.

Of these, a phosphite and a hypophosphite are preferable from the viewpoint of storage stability.

A phosphite consists of a monoester, diester, and triester. Generally, a triester is neutral and a monoester and a diester are extremely weakly acidic at from room temperature to about 100° C. Therefore, the effect as a crosslinking catalyst is weak.

It is known that a monoester and a diester are isomerized into tautomers having stronger acidity under high temperature conditions. A triester is hydrolyzed in the presence of hot water or vapor, and converted into a monoester or a diester to exhibit functions as an acid.

This also applies to a hypophosphite. A diester showing neutrality is hydrolyzed and converted into a monoester which shows acidity at a high temperature and hypophosphorous acid.

It is considered that this reaction mechanism allows a phosphite and a hypophosphite to exhibit functions as a crosslinking catalyst in the presence of hot water or vapor.

A phosphite or a hypophosphite is obtained by reacting an organic compound having a hydroxyl group with phosphorous acid or hypophosphorous acid. As examples of an organic compound having a hydroxyl group which is reacted with phosphorous acid or hypophosphorous acid, an alcohol in which a saturated or unsaturated aliphatic hydrocarbon having 1–40 carbon atoms is replaced by one or more hydroxyl groups, an alcohol in which a saturated or unsaturated alicyclic hydrocarbon having 5–40 carbon atoms is replaced by one or more hydroxyl groups, a phenol in which an alkyl-substituted or unsubstituted aromatic hydrocarbon having 6–40 carbon atoms is replaced by one or more hydroxyl groups, and the like can be given.

As specific examples of an phosphite obtained by reacting the organic compound having a hydroxyl group with phosphorous acid, the following compounds can be given.

As specific examples of a phosphorous triester, trimethyl phosphite, triethyl phosphite, tripropyl phosphite, tributyl phosphite, trihexyl phosphite, trioctyl phosphite, tridecyl phosphite, triphenyl phosphite, trinonylphenyl phosphite, tristearyl phosphite, diphenyloctyl phosphite, diphenyldecyl phosphite, phenyldidecyl phosphite, (tetraphenyl) dipropylene glycol diphosphite, (tetraphenyl)(tetratridecyl) pentaerythritol tetraphosphite, tetra(tridecyl)-4,4'-isopropylidenediphenyl diphosphite, bis(2,6-di-t-butyl-4-methylphenyl)pentaerythritol diphosphite, bis(2,4-di-t-butylphenyl)pentaerythritol diphosphite, bis(2,4-dicumylphenyl)pentaerythritol diphosphite, bis(2,6-di-cumylphenyl)pentaerythritol diphosphite, distearylpentaerythritol diphosphite, 2,2-methylenebis(4,6-di-t-butylphenyl)octyl phosphite, tris(nonylphenyl) phosphite, tris(di-nonyl-phenyl) phosphite, 1,1,3-tris(2-methyl-4-di-tridecyl-phosphite-5-t-butylphenyl)butane, bis(tridecyl)pentaerythritol diphosphite, bis(nonylphenyl) pentaerythritol diphosphite, distearylpentaerythritol diphosphite, bis(2,6-di-t-butyl-4-methoxycarbonylethylphenyl)-pentaerythritol diphosphite, bis(2,6-di-t-butyl-4-octadecyloxycarbonylethylphenyl)-pentaerythritol diphosphite, and the like can be given.

As specific examples of a phosphorous diester, dimethyl phosphite, diethyl phosphite, dipropyl phosphite, dibutyl phosphite, dihexyl phosphite, dioctyl phosphite, didecyl phosphite, dilauryl phosphite, dioleyl phosphite, diphenyl phosphite, phenyloctyl phosphite, phenyldecyl phosphite, and the like can be given.

As specific examples of a phosphorous monoester, methyl phosphite, ethyl phosphite, propyl phosphite, butyl phosphite, hexyl phosphite, octyl phosphite, decyl phosphite, phenyl phosphite, and the like can be given.

As specific examples of a hypophosphite, the following compounds can be given.

As specific examples of a hypophosphorous diester, dimethyl-phenyl phosphonite, diethyl-phenyl phosphonite, dipropyl-phenyl phosphonite, dibutyl-phenyl phosphonite, dihexyl-phenyl phosphonite, dioctyl-phenyl phosphonite, didecyl-phenyl phosphonite, methyl-diphenyl phosphonite, ethyl-diphenyl phosphonite, propyl-diphenyl phosphonite, butyl-diphenyl phosphonite, hexyl-diphenyl phosphonite, octyl-diphenyl phosphonite, decyl-diphenyl phosphonite, bis[bis(2,4-di-t-butyl-5-methylphenoxy)phosphino] biphenyl, bis[bis(2,4-di-t-butylphenoxy)phosphino] biphenyl, and the like can be given.

As specific examples of a hypophosphorous monester, methyl-phenyl phosphinate, ethyl-phenyl phosphinate, propyl-phenyl phosphinate, butyl-phenyl phosphinate, hexyl-phenyl phosphinate, octyl-phenyl phosphinate, decyl-phenyl phosphinate, and the like can be given.

Of these compounds, a phosphite is preferable from the viewpoint of catalytic activity and storage stability. A phosphorous triester is still more preferable.

As examples of other compounds which generate an acid by hydrolysis, the following compounds can be given.

As specific examples of an organic carboxylate, propyl acetate, butyl acetate, amyl acetate, propyl propionate, butyl propionate, amyl propionate, propyl 2-ethylhexanoate, butyl 2-ethylhexanoate, and the like can be given.

As specific examples of an organic sulfonate, ethyl p-toluenesulfonate, propyl p-toluenesulfonate, butyl p-toluenesulfonate, amyl p-toluenesulfonate, ethyl decanesulfonate, propyl decanesulfonate, amyl decanesulfonate, and the like can be given.

As specific examples of an organic sulfinate, ethyl p-toluenesulfinate, propyl p-toluenesulfinate, butyl p-toluenesulfinate, amyl p-toluenesulfinate, ethyl decanesulfinate, and propyl decanesulfinate, butyl decanesulfinate, amyl decanesulfinate, and the like can be given.

As specific examples of an iminosulfonate, 2,3,4-trihydronaphthyl-1-imino-N-phenylsulfonate, and the like can be given.

The acid catalyst (crosslinking catalyst) which functions as an acid by hydrolysis is used in an amount of 0.001–10 parts by weight, preferably 0.01–5.0 parts by weight, and still more preferably 0.05–2.0 parts by weight per 100 parts by weight of the cyclic olefin addition copolymer. If the amount of the acid catalyst is less than 0.001 part by weight, the effect as a crosslinking catalyst is insufficient. If the amount exceeds 10 parts by weight, problems such as a decrease in transparency of the resulting crosslinked product (crosslinked resin film) and an increase in the amount of volatile components during heating may occur.

As a compound which is mixed and/or condensed with the cyclic olefin addition copolymer of the present invention to form a resin film, the following compounds (A) and (B) can be given (these compounds are hereinafter collectively referred to as "additional compound (1)").

Compound (A)

The compound (A) is at least one compound selected from an organosilane shown by the following formula (3) (hereinafter referred to as "organosilane (1)"), a hydrolyzate of the organosilane (1), and a condensation product of the organosilane (1):

$$(R^7)_p Si(OR^8)_{4-P} \quad (3)$$

wherein $R^7$ individually represents an organic group having 1–10 carbon atoms, $R^8$ individually represents an alkyl group having 1–5 carbon atoms or an acyl group having 1–6 carbon atoms, and p is an integer of 0–2.

Compound (B)

The compound (B) is at least one metal oxide selected from the group consisting of silica, alumina, zirconia, and titania.

A film or a sheet having a small coefficient of linear expansion, specifically, exhibiting high dimensional stability is obtained by adding the additional compound (1).

In the hydrolyzate of the organosilane (1), not all the $R^8$ groups in the organosilane (1) are necessarily hydrolyzed. For example, only one of the $R^8$ groups may be hydrolyzed or two or more $R^8$ groups may be hydrolyzed. In addition, the hydrolyzate of the organosilane (1) may be a mixture of these compounds.

The condensation product of the organosilane (1) is a compound in which silanol groups in the hydrolyzate of the organosilane (1) are condensed to form an Si—O—Si bond. In the present invention, not all the silanol groups are necessarily condensed. The condensation product of the organosilane (1) also includes a compound in which only a small amount of silanol groups are condensed and a mixture of compounds with different degrees of condensation.

In the above formula (3), the number of carbon atoms of $R^7$ is 1 to 10, and preferably 1 to 8. As examples of the monovalent organic group represented by $R^7$, an alkyl group such as a methyl group, ethyl group, n-propyl group, i-propyl group, n-butyl group, i-butyl group, sec-butyl group, t-butyl group, n-hexyl group, n-heptyl group, n-octyl group, and 2-ethylhexyl group, an acyl group such as an acetyl group, propionyl group, butyryl group, valeryl group, benzoyl group, trioyl group, and caproyl group, a vinyl group, allyl group, cyclohexyl group, phenyl group, glycidyl group, (meth)acryloxy group, ureido group, amide group, fluoroacetamide group, isocyanate group, substitution derivatives of these groups, and the like can be given.

As examples of substituents in the substitution derivatives represented by $R^7$, a halogen atom, substituted or unsubstituted amino group, hydroxyl group, mercapto group, isocyanate group, glycidoxy group, 3,4-epoxycyclohexyl group, (meth)acryloxy group, ureido group, ammonium salt group, and the like can be given. The number of carbon atoms of the substitution derivative represented by $R^7$ is 20 or less including the carbon atoms of the substituent.

When two $R^7$s are present in the formula (3), the two $R^7$s may be either the same or different.

As examples of an alkyl group having 1–5 carbon atoms represented by $R^8$, a methyl group, ethyl group, n-propyl group, i-propyl group, n-butyl group, isec-butyl group, t-butyl group, n-pentyl group, and the like can be given. As examples of an acyl group having 1–6 carbon atoms, an acetyl group, propionyl group, butyryl group, valeryl group, caproyl group, and the like can be given.

As specific examples of the organosilane (1), tetraalkoxysilanes such as tetramethoxysilane, tetraethoxysilane, tetra-n-propoxysilane, tetra-i-propoxysilane, and tetra-n-butoxysilane; trialkoxysilanes such as methyltrimethoxysilane, methyltriethoxysilane, ethyltrimethoxysilane, ethyltriethoxysilane, n-propyltrimethoxysilane, n-propyltriethoxysilane, i-propyltrimethoxysilane, i-propyltriethoxysilane, n-butyltrimethoxysilane, n-butyltriethoxysilane, n-pentyltrimethoxysilane, n-hexyltrimethoxysilane, n-heptyltrimethoxysilane, n-octyltrimethoxysilane, vinyltrimethoxysilane, vinyltriethoxysilane, cyclohexyltrimethoxysilane, cyclohexyltriethoxysilane, phenyltrimethoxysilane, phenyltriethoxysilane, 3-chloropropyltrimethoxysilane, 3-chloropropyltriethoxysilane, 3,3,3-trifluoropropyltrimethoxysilane, 3,3,3-trifluoropropyltriethoxysilane, 3-aminopropyltrimethoxysilane, 3-aminopropyltriethoxysilane, 2-hydroxyethyltrimethoxysilane, 2-hydroxyethyltriethoxysilane, 2-hydroxypropyltrimethoxysilane, 2-hydroxypropyltriethoxysilane, 3-hydroxypropyltrimethoxysilane, 3-hydroxypropyltriethoxysilane, 3-mercaptopropyltrimethoxysilane, 3-mercaptopropyltriethoxysilane, 3-isocyanatepropyltrimethoxysilane, 3-isocyanatepropyltriethoxysilane, 3-glycidoxypropyltrimethoxysilane, 3-glycidoxypropyltriethoxysilane, 2-(3,4-epoxycyclohexyl)ethyltrimethoxysilane, 2-(3,4-epoxycyclohexyl)ethyltriethoxysilane, 3-(meth)acryloxypropyltrimethoxysilane, 3-(meth)acryloxypropyltriethoxysilane, 3-ureidopropyltrimethoxysilane, and 3-ureidopropyltriethoxysilane; dialkoxysilanes such as dimethyldimethoxysilane, dimethyldiethoxysilane, diethyldimethoxysilane, diethyldiethoxysilane, di-n-propyldimethoxysilane, di-n-propyldiethoxysilane, di-i-propyldimethoxysilane, di-i-propyldiethoxysilane, di-n-butyldimethoxysilane, di-n-butyldiethoxysilane, di-n-pentyldimethoxysilane, di-n-pentyldiethoxysilane, di-n-hexyldimethoxysilane, di-n-hexyldiethoxysilane, di-n-heptyldimethoxysilane, di-n-heptyldiethoxysilane, di-n-octyldimethoxysilane, di-n-octyldiethoxysilane, di-n-cyclohexyldimethoxysilane, di-n-cyclohexyldiethoxysilane, diphenyldimethoxysilane, and diphenyldiethoxysilane; methyltriacetyloxysilane, dimethyldiacetyloxysilane, and the like can be given.

As the tetraalkoxysilanes, tetramethoxysilane and tetraethoxysilane are preferable. As the trialkoxysilanes, methyltrimethoxysilane and methyltriethoxysilane are preferable. As the dialkoxysilanes, dimethyldimethoxysilane and dimethyldiethoxysilane are preferable.

In the present invention, the organosilane (1) is particularly preferably only a tetraalkoxysilane, only a trialkoxysilane, or a combination of 10–90 mol % of tetraalkoxysilane and 10–90 mol % of trialkoxysilane. The degree of crosslinking of the resulting film can be increased and adhesion can be improved by introducing the tetraalkoxysilane or trialkoxysilane.

The organosilane (1) is used as is, or as a hydrolyzate and/or a condensation product.

The hydrolyzate and condensation product may be obtained not only by hydrolysis and/or condensation of the organosilane (1), but also by hydrolysis and/or condensation of a chlorosilane compound such as methyltrichlorosilane, ethyltrichlorosilane, phenyltrichlorosilane, dimethyldichlorosilane, diethyldichlorosilane, and diphenyldichlorosilane.

In the case where the organosilane (1) is used as a condensation product, the polystyrene-reduced weight average molecular weight (hereinafter referred to as "Mw") of the condensation product is preferably 800 to 100,000, and still more preferably 1,000 to 50,000.

The hydrolyzate and condensation product of the organosilane (1) are commercially available as MKC silicate manufactured by Mitsubishi Chemical Corp., ethyl silicate manufactured by Colcoat Co., Ltd., a silicone resin manufactured by Toray-Dow Corning Silicone Corp., a silicone resin manufactured by GE Toshiba Silicones Co., Ltd., a silicone resin manufactured by Shin-Etsu Chemical Co., Ltd., a hydroxyl group-containing polydimethylsiloxane manufactured by Dow Corning Asia Ltd., a silicone oligomer manufactured by Nippon Unicar Co., Ltd., and the like. These products may be used as is or after subjecting to condensation.

The additional compound (1) is added to the composition of the present invention in an amount of 2–70 parts by weight, and preferably 5–50 parts by weight for 100 parts by weight of the cyclic olefin addition copolymer of the present invention. If the amount is less than two parts by weight, the effect of improving solvent resistance and dimensional stability of the resulting film or sheet may be small. If the amount exceeds 70 parts by weight, transparency may be impaired.

In the case where the additional compound (1) forms inorganic particles by hydrolysis and condensation, the resulting composition is optically transparent and exhibits superior heat resistance and dimensional stability by allowing the inorganic particles having a diameter of 100 μm or less, and preferably 10 μm or less to be dispersed in the polymer.

There may be a case where a (crosslinked) resin film of the cyclic olefin addition copolymer containing the above additional compound (1) becomes clouded. In order to solve this problem and to produce a highly transparent (crosslinked) resin film with good reproducibility, a technique of grafting the cyclic olefin addition copolymer and the additional compound (1) during or before casting to improve dispersibility of the additional compound (1) into the copolymer may be employed. In more detail, grafting between the alkoxysilyl group in the copolymer and the additional compound (1) progresses by the action (hydrolysis and condensation of alkoxysilyl group) of a metal catalyst (1) given below.

Metal Catalyst (1)

As examples of the metal catalyst (1), an aluminum (Al) compound, zirconium (Zr) compound, tin (Sn) compound, zinc (Zn) compound, calcium (Ca) compound, barium (Ba) compound, titanium (Ti) compound, scandium (Sc) compound, lanthanide (Gd, Yb, Sm, and Nd) compound, antimony (Sb) compound, yttrium (Y) compound, cerium (Ce) compound, and the like can be given.

As specific examples of these compounds, the following compounds can be given.

As specific examples of aluminum compounds, organoaluminum compounds such as tri-i-propoxyaluminum, di-i-propoxy·aluminum ethylacetoacetate, di-i-propoxy·acetylacetonate aluminum, i-propoxy·bis(ethylacetoacetate) aluminum, i-propoxy·bis(acetylacetonate) aluminum, tris(ethylacetoacetate) aluminum, tris(acetylacetonate) aluminum, monoacetylacetonate·bis (ethylacetoacetate, aluminum, and the like can be given.

As specific examples of zirconium compounds, organozirconium compounds such as tetra-n-butoxyzirconium, tri-n-butoxy·ethylacetoacetate zirconium, di-n-butoxy·bis(ethylacetoacetate) zirconium, n-butoxy·tris(ethylacetoacetate) zirconium, tetrakis(n-propylacetoacetate) zirconium, tetrakis(acetylacetoacetate) zirconium, tetrakis(ethylacetoacetate) zirconium, and the like can be given.

As specific examples of tin compounds, carboxylic acid type organotin compounds such as $Sn(OCOCH_3)_2$, $Sn(OCOC_2H_5)_2$, $Sn(OCOC_3H_7)_2$, $Sn(OCOC_4H_9)_2$, $Sn(OCOC_5H_{11})_2$, $Sn(OCOC_6H_{13})_2$, $Sn(OCOC_7H_{15})_2$, $Sn(OCOC_8H_{17})_2$, $Sn(OCOC_9H_{19})_2$, $Sn(OCOC_{10}H_{21})_2$, $Sn(OCOC_{11}H_{23})_2$, $Sn(OCOCH=CHCOOCH_3)_2$, $Sn(OCOCH=CHCOOC_4H_9)_2$, $Sn(OCOCH=CHCOOC_8H_{17})_2$, $Sn(OCOCH=CHCOOC_{16}H_{33})_2$, $Sn(OCOCH=CHCOOC_{17}H_{35})_2$, $Sn(OCOCH=CHCOOC_{18}H_{37})_2$, $Sn(OCOCH=CHCOOC_{20}H_{41})_2$, $(C_4H_9)_2Sn(OCOC_{11}H_{23})_2$, $(C_4H_9)_2Sn(OCOCH=CHCOOCH_3)_2$, $(C_4H_9)_2Sn(OCOCH=CHCOOC_4H_9)_2$, $(C_8H_{17})_2Sn(OCOC_8H_{17})_2$, $(C_8H_{17})_2Sn(OCOC_{11}H_{23})_2$, $(C_8H_{17})_2Sn(OCOCH=CHCOOCH_3)_2$, $(C_8H_{17})_2Sn(OCOCH=CHCOOC_4H_9)_2$, $(C_8H_{17})_2Sn(OCOCH=CHCOOC_8H_{17})_2$, $(C_8H_{17})_2Sn(OCOCH=CHCOOC_{16}H_{33})_2$, $(C_8H_{17})_2Sn(OCOCH=CHCOOC_{17}H_{35})_2$, $(C_8H_{17})_2Sn(OCOCH=CHCOOC_{18}H_{37})_2$, $(C_8H_{17})_2Sn(OCOCH=CHCOOC_{20}H_{41})_2$,

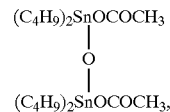

$(C_4H_9)Sn(OCOC_{11}H_{23})_3$, and $(C_4H_9)Sn(OCONa)_3$; mercaptide type organotin compounds such as $(C_4H_9)_2Sn(SCH_2COOC_8H_{17})_2$, $(C_4H_9)_2Sn(SCH_2CH_2COOC_8H_{17})_2$, $(C_8H_{17})_2Sn(SCH_2COOC_8H_{17})_2$, $(C_8H_{17})_2Sn$ $(SCH_2CH_2COOC_8H_{17})_2$, $(C_8H_{17})_2Sn(SCH_2COOC_{12}H_{25})_2$, $(C_8H_{17})_2Sn(SCH_2CH_2COOC_{12}H_{25})_2$, $(C_4H_9)Sn(SCOCH=CHCOOC_8H_{17})_3$, $(C_8H_{17})Sn(SCOCH=CHCOOC_8H_{17})_3$, and

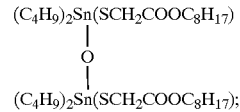

sulfide type organotin compounds such as $(C_4H_9)_2Sn=S$, $(C_8H_{17})_2Sn=S$, and

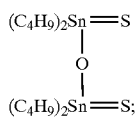

chloride type organotin compounds such as $(C_4H_9)SnCl_3$, $(C_4H_9)_2SnCl_2$, $(C_8H_{17})_2SnCl_2$, and

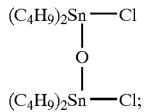

organotin oxides such as $(C_4H_9)_2SnO$ and $(C_8H_{17})_2SnO$; a reaction products of these organotin oxides and an ester compound such as silicate, dimethyl maleate, diethyl maleate, and dioctyl phthalate; and the like can be given.

As specific examples of zinc compounds, zinc acetate, zinc octanoate, and the like can be given.

As specific examples of calcium compounds, calcium acetate, calcium octanoate, and the like can be given.

As specific examples of barium compounds, barium acetate, barium octanoate, and the like can be given.

As specific examples of titanium compounds, tetra-i-propoxytitanium, di-i-propoxy.bis(ethylacetoacetate) titanium, di-i-propoxy.bis(acetylacetonate) titanium, di-i-propoxy.bis(acetylacetone) titanium, and the like can be given.

As specific examples of scandium compounds, scandium tri-isopropoxide, and the like can be given.

As specific examples of lanthanide compounds, isopropoxide or butoxide compounds of Gd, Yb Sm, and Nd, and the like can be given.

As specific examples of antimony compounds, antimony acetate, antimony ethylene glycoxide, and the like can be given.

As specific examples of yttrium compounds, yttrium triisopropoxide, yttrium tris(aluminum tetraisopropoxide) and the like can be given.

As specific examples of cerium compounds, triisopropoxycerium, cerium trichloride, and the like can be given.

The metal catalyst (1) may be used either individually or in combination of two or more. The metal catalyst (1) may be used together with a zinc compound or other reaction retardants.

The amount of the metal catalyst (1) is usually 0.0001 to 10 mol, preferably 0.001 to 7 mol, and still more preferably 0.001 to 5 mol for one mol of $OR^8$ included in the organosilane (1). If the amount of the organometallic compound (1) is 10 mol or less, the resulting composition excels in storage stability. Moreover, the resulting film excels in hardness, whereby cracking rarely occurs.

The resin film including the cyclic olefin addition copolymer of the present invention may be produced by a solution casting method.

The film is produced by the casting method as follows. A solution in which the cyclic olefin addition copolymer, the acid catalyst (compound which generates an acid by hydrolysis, for example), and, optionally, the additional compound (1) and the metal catalyst (1) are homogeneously mixed in an organic solvent of the cyclic olefin addition copolymer (polymerization solvent of the copolymer, for example) is reacted or aged for a specific period of time at a specific temperature. The solution is optionally concentrated or diluted to a concentration appropriate for casting. The solution is then cast onto a flat and smooth fluorine-containing resin plate or a glass plate using a T type die or the like. After removing the solvent by evaporation, the solution is optionally heated. Solubility of the solvent used as a cast solvent differs depending on the type of the polymer. At least one compound selected from hydrocarbon compounds, halogenated hydrocarbon compounds, ethers, esters, ketones, amines, amides, alcohols, phenols, and sulfoxides is used as the solvent. The amount of the solvent is 1 to 10,000 parts by weight, and preferably 10 to 5,000 parts by weight for 100 parts by weight of the polymer.

The solvent may be partly or entirely replaced by another solvent before casting in order to adjust solubility or viscosity of each component, or to facilitate casting.

The cast film is crosslinked by heating the film in the presence of water or vapor. In the case where the acid catalyst (crosslinking catalyst) is not added, the film is not crosslinked at all because a siloxane bond is not formed even if the film is heated in the presence of vapor. If a sufficient amount of water is not supplied for the content of the alkoxysilane in the polymer, crosslinking becomes insufficient. The reaction temperature is 50° C. or more, preferably 60 to 300° C., still more preferably 80 to 250° C., and particularly preferably 100 to 200° C. If the reaction temperature is less than 50° C., the film is crosslinked to only a small extent. If the reaction temperature exceeds 300° C., the polymer may be decomposed due to heat.

The crosslinking time is appropriately selected depending on the desired degree of crosslinking, state of the reaction system, type of polymer, and type and amount of the catalyst. The crosslinking time is usually one minute to 1,000 hours, preferably five minutes to 100 hours, and still more preferably 10 minutes to 50 hours.

The crosslinked product (crosslinked resin film) of the present invention preferably has a degree of swelling measured in toluene at 25° C. of less than 500%, and still more preferably 300% or less.

If the degree of swelling in toluene is 500% or more, chemical resistance, solvent resistance, and dimensional stability during heating may be insufficient when the crosslinked product is used as an alternative to glass. The degree of swelling used herein refers to a value measured by a method described later. The degree of swelling of the crosslinked product may be readily adjusted by the amount of crosslinking catalyst, reaction temperature, and reaction time.

The coefficient of linear expansion of the crosslinked resin film of the present invention is preferably 65 (ppm/° C.) or less, and still more preferably 60 (ppm/° C.) or less from the viewpoint of applications of the film.

The transparent (crosslinked) resin film of the present invention has high affinity to glass due to the presence of a silyl group. When the resin film of the present invention is subjected to a test for adhesion to quartz glass, the number of blocks removed among 25 blocks is preferably five or less, still more preferably three or less, and particularly preferably one or less.

In order to improve oxidation stability, conventional antioxidants such as phenol-type or hydroquinone-type antioxidants such as 2,6-di-t-butyl-4-methylphenol, 4,4'-thiobis-(6-t-butyl-3-methylphenol), 1,1'-bis(4-hydroxyphenyl) cyclohexane, 2,2'-methylenebis(4-ethyl-6-t-butylphenol), 2,5-di-t-butylhydroquinone, and pentaerythrityl-tetrakis[3-(3,5-di-t-butyl-4-hydroxyphenyl)]propionate; and phosphorus-type antioxidants such as tris(4-methoxy-3,5-diphenyl)phosphite, tris(nonylphenyl)phosphite, tris(2,4-dit-butylphenyl)phosphite, bis(2,6-di-t-butyl-4-methylphenyl) pentaerythritol diphosphite, and bis(2,4-di-t-butylphenyl) pentaerythritol diphosphite, may be added to the composition of the present invention. The amount of antioxidant to be added is usually 0.1 to 5 parts by weight, and preferably 0.2 to 3 parts by weight for 100 parts by weight of the cyclic olefin addition copolymer of the present invention and the additional compound (1) in total. If the amount of antioxidant is too small, the effect of improving durability is insufficient. If the amount is too great, the surface of the formed product may bleed, or transparency may be decreased.

The composition of the present invention may be stabilized by adding a UV absorber such as 2,4-dihydroxybenzophenone or 2-hydroxy-4-methoxybenzophenone. Additives such as lubricants may be added to the composition in order to improve formability.

The (crosslinked) resin film obtained by using the transparent resin of the cyclic olefin addition copolymer composition of the present invention may be used as a film for a display device such as a liquid crystal display device and an EL display device.

The thickness of the film for a display device of the present invention is usually 5–600 $\mu$m, preferably 10–500 $\mu$m, and still more preferably 25–400 $\mu$m. The thickness of the film is appropriately determined depending on the application. The film for a display device of the present invention preferably has a small variation in retardation. The variation in retardation of the film at a wavelength of 633 nm is preferably within ±20%. If the variation in retardation is not within ±20%, the film is optically nonuniform. If the film is used for a display device, it is difficult to obtain good display performance due to distortion of the image of the display and the like. In the present invention, the retardation value is measured at a wavelength of 633 nm by using an ellipsometer "DVA-36LS" (manufactured by Mizojiri Optical Co., Ltd.).

A liquid crystal substrate film of the present invention is obtained by using the above film for a display device. The liquid crystal substrate film usually has a thickness of 25–400 $\mu$m, an unevenness of the thickness over the entire surface within ±30% of the thickness, and an Rmax value of 0.2 $\mu$m or less. The liquid crystal substrate film preferably has an unevenness of the thickness over the entire surface within ±20% of the thickness, and an Rmax value of 0.1 $\mu$m or less. If the unevenness of the thickness is great, or flatness and smoothness of the surface is insufficient, the screen of the liquid crystal display device may be distorted.

A polarizing film of the present invention is manufactured by attaching the film for a display device of the present invention as a protective layer to a polarizing film produced by using a PVA film or the like as a base. The thickness of the protective layer is usually 5–500 $\mu$m, preferably 10–300 $\mu$m, and still more preferably 20–200 $\mu$m. The protective layer may be provided on the polarizing film by using a tackifier or an adhesive. Use of a tackifier or an adhesive excelling in transparency is preferable. As specific examples of tackifiers and adhesives, curable tackifiers such as natural rubber, synthetic rubber, a vinyl acetate/vinyl chloride copolymer, polyvinyl ether, acrylic-based tackifiers, modified polyolefin-based tackifiers, and tackifiers in which a curing agent such as an isocyanate is added to these materials, dry laminate adhesives in which a polyurethane resin solution and a polyisocyanate resin solution are mixed, synthetic rubber-based adhesives, epoxy-based adhesives, and the like can be given.

There are no specific limitations to a polarizing film used in the present invention insofar as the polarizing film has a function of a polarizer. As examples of the polarizing film, a PVA-iodine polarizing film, a dye-based polarizing film in which a dichromatic dye is adsorbed and oriented on a PVA film, a polyene-based polarizing film in which a polyene is formed by inducing dehydration of a PVA film or dehydrochlorination of a polyvinyl chloride film, a polarizing film having a dichromatic dye on the surface and/or inside of a PVA film formed of modified PVA containing a cationic group in the molecule, and the like can be given. There are no specific limitations to a method of manufacturing the polarizing film. For example, a conventional method such as a method of stretching a PVA film and causing an iodine ion to be adsorbed on the PVA film, a method of dyeing a PVA film using a dichromatic dye and stretching the PVA film, a method of stretching a PVA film and dyeing the PVA film using a dichromatic dye, a method of printing a dichromatic dye on a PVA film and stretching the PVA film, and a method of stretching a PVA film and printing a dichromatic dye on the PVA film can be given. In more detail, a method of manufacturing a polarizing film by forming a higher order iodine ion by dissolving iodine in a potassium iodide solution, causing the iodine ion to be adsorbed on a PVA film, stretching the PVA film, and immersing the PVA film in a 1–4 wt % boric acid aqueous solution at 30–40° C., a method of manufacturing a polarizing film by subjecting a PVA film to the boric acid treatment, stretching the PVA film about 3–7 times in the uniaxial direction, causing a dichromatic dye to be adsorbed on the PVA film by immersing the PVA film in a 0.05–5 wt % dichromatic dye aqueous solution at 30–40° C., and thermally securing the dye on the film by drying at 80–100° C., and the like can be given.

A surface protective film used in the present invention is the same as the film attached to the polarizing film in the manufacture of the polarizing film. The surface protective film is attached to one side or each side of a thin film part for a display device in order to protect the surface of the thin film part.

A retardation film used in the present invention is manufactured by subjecting the above film for display devices to stretching and orientation or to surface press. The thickness of the film before stretching is usually 25–500 $\mu$m, preferably 50–400 $\mu$m, and still more preferably 100–300 $\mu$m. As the stretching method, a conventional uniaxial stretching method such as a lateral uniaxial stretching method using a tenter method, an inter-roll compression stretching method, and a vertical uniaxial stretching method using rolls having different rims may be used. A biaxial stretching method in which a film is stretched within the range which does not affect the orientation of the molecules, and stretched in the uniaxial direction so that the molecules are oriented may also be used. The film obtained in the above manner has a constant retardation value since the molecules are oriented by stretching. The retardation maybe controlled by retardation of the sheet before stretching, stretch magnification, stretch temperature, and thickness of stretched and oriented film. If the thickness of the sheet before stretching is constant, the absolute value of the retardation tends to be increased as the stretch magnification of the film is increased. Therefore, a stretched and oriented film having desired retardation can be obtained by changing the stretch magnification.

In the present invention, a preferable range of the retardation of the film obtained by using the above method differs depending upon the type or shape of the liquid crystal display, for which a film having a retardation value measured by using a polarization microscope of 5–900 nm is used. For example, a polarizing film used for a TFT liquid crystal display device must have high transparency. Therefore, an optically uniform film having retardation of 10–80 nm is suitably used.

A transparent conductive film of the present invention is manufactured by forming a transparent conductive layer on a film formed of the transparent resin of the present invention. As a material for forming the transparent conductive layer, a metal such as Sn, In, Ti, Pb, Au, Pt, or Ag, or an oxide of these metals is generally used. These metals are deposited on the liquid crystal substrate film to a thickness of usually 10–10,000 angstroms, and preferably 50–5,000 angstroms by using a plasma method, sputtering method, vacuum deposition method, plating, ion plating method, spray method, electrolytic deposition method, or the like. In the case of forming a single metal on the film, the metal element may optionally be oxidized thereafter. The conductive layer may be formed as an oxide layer, or formed by forming a film in the form of a single metal or a lower oxide, and subjecting the film to an oxidation treatment such as thermal oxidation, anodic oxidation, or liquid phase oxidation. The resistivity of the transparent conductive film is preferably 100 ohm cm or less.

A light diffusion film of the present invention is manufactured by forming a pattern having a shape which has a diffusing function on one side of a film formed of the transparent resin of the present invention. The pattern having a shape which has the diffusing function may be formed by embossing, applying a photocurable resin such as a UV-curable resin, or applying various types of coating materials.

As the photocurable resin used for forming the pattern on the film of the present invention, a composition containing at least one compound having one or more ethylenic double bonds -such as a (meth)acryloyl group in the molecule and a photoinitiator, a composition containing at least one compound having one or more groups having ring-opening reactivity such as an epoxy group in the molecule and a cationic photoinitiator, a composition containing gelatin and bichromate, a composition containing cyclized rubber and a bisazide-type sensitizer, a composition containing a novolac resin and a quinoneazide-type sensitizer, and the like can be given. The surface of the film may be subjected to a physical base processing such as a plasma processing or a chemical base processing by using various types of coating materials such as conventional rubber-based and resin-based coating materials, in particular, acrylic-based, and silicon-based coating materials before applying the photocurable resin in order to control adhesion of the surface of the film or sheet.

A prism sheet for improving brightness of a display device by collecting diffused light passing through the light diffusion film at an angle of view of the display device is manufactured by providing a minute prism angle at the surface of a transparent film. The prism sheet can be manufactured by embossing a pattern of a prism angle on the surface of a film formed of the transparent resin of the present invention, or forming the pattern by applying a photocurable resin such as a UV-curable resin in the same manner as the above light diffusion film.

The (crosslinked) resin film of the present invention is useful as a film for an EL display device. As the film for an EL display device, a substrate film, polarizing film, surface protective film, transparent conductive film, which are used for the liquid crystal display device, and the like can be given. Characteristics of these films are not necessarily the same as those of the films used for the liquid crystal display device.

The (crosslinked) resin film of the present invention may be used as a transparent conductive composite material by forming a transparent conductive film on the surface of the (crosslinked) resin film. The transparent conductive composite material is useful as an electrode film for the liquid crystal display device and the EL display device and as an electromagnetic preventive film for electronic equipment such as a CRT.

The (crosslinked) resin film of the present invention may be used as an antireflection film by forming an antireflection film of which a layer in contact with the surface of the (crosslinked) resin film film or sheet is formed of SiOx ($0.8 \leq x \leq 1.8$) and the outermost layer is formed of $SiO_2$. Since the antireflection film excels in heat resistance, the antireflection film is useful not only for a liquid crystal display device and an EL display device, but also for a plasma display, a field emission display, or the like.

In the case of using the films for display devices of the present invention so that the films are adjacent to each other, the number of parts, and the thickness and the weight of the display device can be decreased by integrating the films in advance. For example, the liquid crystal substrate film and the polarizing film, the retardation film and the transparent conductive film, the light diffusion film and the prism sheet, or the polarizing film and the light diffusion film may be integrated in advance. These films are bonded to each other by forming an adhesive layer and/or an anchor coat layer therebetween. As the adhesive layer, a heat resistant resin such as an epoxy resin, polyimide, polybutadiene, phenol resin, and polyether ether ketone can be given. As the anchor coat layer, a compound containing an acrylic prepolymer such as epoxy diacrylate, urethane diacrylate, and polyester diacrylate as a component may be used. As the curing method, a conventional technique such as curing by using ultraviolet rays or heat may be used.

Since the film for a display device of the present invention excels in optical transparency, heat resistance, hygroscopic resistance, liquid crystal resistance, dimensional stability, and adhesion, the film is suitably used in the manufacture of a liquid crystal display device and an EL display device. These display devices may be used for personal computers, televisions, portable telephones, digital information terminals, pocket bells, car navigation systems, liquid crystal monitors, light modulator panels, displays for OA equipment, displays for AV equipment, and the like.

EXAMPLES

The present invention is described in more detail by examples. However, these examples should not be construed as limiting the present invention.

The molecular weight, degree of swelling, glass transition temperature, liquid crystal resistance, total light transmittance, and birefringence were measured by using the following methods.

(1) Weight Average Molecular Weight and Number Average Molecular Weight

The molecular weight was measured at 120° C. by using a gel permeation chromatography (GPC) system ("150C" manufactured by Waters) utilizing an H-type column (manufactured by Tosoh Corp.) and o-dichlorobenzene as a solvent. The molecular weight is indicated as a standard polystyrene-reduced value.

(2) Content of Metal Atom

The content of metal atoms remaining in a copolymer was determined by using an atomic absorption spectrophotometer ("Z-9000" manufactured by Hitachi, Ltd.) based on a calibration curve created by using standard solutions of nickel and aluminum (manufactured by Wako Pure Chemical Industries, Ltd.).

(3) Degree of Swelling in Toluene

A film or a sheet having a length of 2 cm, a width of 2 cm, and a thickness of 50 to 500 μm was immersed in toluene at 25° C. for three hours. The degree of swelling of the film or sheet was calculated from the weight ratio before and after immersion. The degree of swelling was 100% when the film or sheet did not swell at all.

(4) Glass Transition Temperature

The glass transition temperature of the cyclic olefin addition copolymer of the present invention cannot be clearly measured by a differential scanning calorimetry (DSC) in many cases. Therefore, the glass transition temperature was specified by a peak temperature of Tan δ (ratio of storage modulus of elasticity (E') to loss modulus of elasticity E" (E'/E")) measured by dynamic viscoelasticity. Dynamic viscoelasticity was measured by using Rheovibron DDV-01FP (manufactured by Orientec Co., Ltd.) at a frequency of 10 Hz, a temperature increase rate of 4° C./min., a vibration mode of single waveform, and a vibration amplitude of 2.5 μm.

(5) Total Light Transmittance

The total light transmittance of a film having a thickness of 100 μm was measured according to ASTM-D1003.

(6) Coefficient of Linear Expansion

A sample having a length of 10 cm, a width of 3 mm, and a thickness of 100 μm was secured in a thermal mechanical analyzer (TMA) ("SS6100" manufactured by Seiko Instrument Inc.) at a chuck distance of 10 mm. The sample was heated from room temperature to about 200° C. to remove residual strain. The sample was heated from room temperature at a rate of 3° C./min. to determine the coefficient of linear expansion from an increase in the chuck distance.

(7) Liquid Crystal Resistance

A sample having a length of 2 cm, a width of 2 cm, and a thickness of 50 to 500 μm was immersed in a liquid crystal for TFT (ZLI5081, manufactured by Merck Japan Ltd.). After applying the liquid crystal to the sample in an amount of about 20 mg, the sample was heated at 150° C. for one hour in air. A change in the surface of the sample was evaluated by naked eye observation. The evaluation criteria were as follows.

◎: No change in shape was observed
○: Small degree of swelling was observed
Δ: Swelling was observed
×: Shape could not be maintained due to dissolution or the like (8) Adhesion Aluminum was deposited on a film for evaluation. The film was cut so that 10×10 squares with dimensions of 1 mm×1 mm were formed. The film was then subjected to a peeling test using an adhesive cellophane tape to measure the number of blocks removed among 25 blocks. In the evaluation of adhesion to quartz glass, the composition of the present invention was applied to quartz glass so that the thickness after drying was 5 to 10 μm. The composition was dried and cured at 90° C., and subjected to the above peeling test using an adhesive cellophane tape.

(9) Birefringence (nm)

Birefringence was measured by using an ellipsometer (manufactured by Mizojiri Optical Co., Ltd.).

Reference Example 1

Synthesis of Copolymer (a)

A 1-liter reaction vessel was charged with 593.75 mmol of 2-norbornene and 31.25 mmol of 5-triethoxysilyl-2-norbornene as monomers, 500 g of toluene as a solvent, and 0.25 mmol of 1,5-cyclooctadiene as a molecular weight modifier in nitrogen atmosphere. The reaction system was maintained at 10° C. 0.25 mmol of a nickel compound prepared by reacting nickel octanoate and hexafluoroantimonate at −15° C. at a molar ratio of 1:1, 2.25 mmol of a trifluoroboron-diethyl ether complex, and 2.5 mmol of triethylaluminum were added to the mixture.

The mixture was polymerized at 30° C. for one hour. The polymerization was terminated by the addition of isopropyl alcohol. The conversion rate into the copolymer was 95%. 6 g of lactic acid was added to the copolymer solution and allowed to react with the catalytic component. The copolymer solution was placed in four liters of isopropanol to coagulate the copolymer, and unreacted monomers and catalytic residues were removed.

The coagulated copolymer was dried to obtain a copolymer (a).

As a result of $^1$H-NMR analysis at 270 MHz (methylene absorption of ethoxysilyl group at 3.8–4.0 ppm; solvent: deuterated toluene; reference: TMS), the content of a structure derived from 5-triethoxysilyl-2-norbornene in the copolymer (a) was 5.0 mol %. The polystyrene-reduced number average molecular weight and weight average molecular weight of the copolymer (a) were respectively 87,000 and 211,000. The content of nickel and aluminum remaining in the copolymer (a) was 0.1 ppm or less and 1.6 ppm, respectively.

Reference Example 2

Synthesis of Copolymer (b)

A copolymer (b) was obtained in the same manner as in Reference Example 1 except for using 562.5 mmol of 2-norbornene and 62.5 mmol of 5-triethoxysilyl-2-norbornene as monomers.

As a result of $^1$H-NMR analysis at 270 MHz (methylene absorption of ethoxysilyl group at 4 ppm; solvent: deuterated toluene; reference: TMS), the content of a structure derived from 5-triethoxysilyl-2-norbornene in the copolymer (b) was 9.9 mol %. The polystyrene-reduced number average molecular weight and weight average molecular weight of the copolymer (b) were respectively 88,000 and 223,000. The content of nickel and aluminum remaining in the copolymer (b) was 0.1 ppm or less and 1.6 ppm, respectively.

Reference Example 3

Synthesis of Copolymer (c)

A copolymer (c) was obtained in the same manner as in Reference Example 1 except for using 531.23 mmol of 2-norbornene, 62.50 mmol of 5-triethoxysilyl-2-norbornene, and 31.25 mmol of 8-methyl-8-methoxycarbonyl-3-tetracyclo[4.4.0.1$^{2,5}$.1$^{7,10}$]dodecene as monomers.

As a result of $^1$H-NMR analysis at 270 MHz (methylene absorption of ethoxysilyl group at 4 ppm; solvent: deuterated toluene; reference: TMS), the content of a structure derived from 5-triethoxysilyl-2-norbornene in the copolymer (c) was 9.9 mol %. The content of a structure derived from 8-methyl-8-methoxycarbonyl-3-tetracyclo[4.4.0.1$^{2,5}$.1$^{7,10}$]dodecene in the copolymer (c) was 4.9 mol % from the calibration curve of characteristic IR absorption at 1730 cm$^{-1}$. The polystyrene-reduced number average molecular weight and weight average molecular weight of the copolymer (c) were respectively 89,000 and 256,000. The content of nickel and aluminum remaining in the copolymer (c) was 0.1 ppm or less and 1.1 ppm, respectively.

Example 1
Preparation of Crosslinked Film of Copolymer (a), P Added, Sn Not Added 10 g of the copolymer (a) was dissolved in 40 g of toluene containing 70 ppm of water. 1.0 part by weight of pentaerythrityl-tetrakis[3-(3,5-di-t-butyl-4-hydroxyphenyl) propionate] as an andioxidant was added to the mixture for 100 parts by weight of the copolymer. After the addition of 0.5 part by weight of tributoxy phosphite as an acid catalyst (crosslinking catalyst), the solution was placed in a petri dish and cast at 40° C. for three hours. The resulting film was dried at 150° C. for two hours and heated for four hours in the presence of vapor at 150° C. The film was dried at 230° C. for one hour under vacuum to obtain a colorless transparent film with a thickness of 100 µm. The film formation conditions, the state of the resulting film, and the degree of swelling are shown in Table 1.

Example 2
Preparation of Crosslinked Film of Copolymer (a), P and Sn Added

A crosslinked film was prepared in the same manner as in Example 1 except for adding dioctyltin (II) to the cast solution prepared in Example 1. The results are shown in Table 1.

Example 3
Preparation of Composite Crosslinked Film of Copolymer (a) and TEOS, P and Sn Added A crosslinked film was prepared in the same manner as in Example 1 except for adding 2 g of tetraethoxysilane (TEOS) and dioctyltin (II) to the cast solution prepared in Example 1. The degree of swelling in toluene of the film was 160%. The coefficient of linear expansion of the film was 48 ppm/° C. The results are shown in Table 1.

Example 4
Preparation of Composite Crosslinked Film of Copolymer (a) and TEOS, P Added, Sn Not Added A crosslinked film was prepared in the same manner as in Example 1 except for adding 2 g of tetraethoxysilane (TEOS) to the cast solution prepared in Example 1. The film became clouded to only a small extent. The total light transmission of the film was 85%. The results are shown in Table 1.

Example 5
Preparation of Composite Crosslinked Film of Copolymer (b) and TEOS, P and Sn Added A film was prepared in the same manner as in Example 3 except for using the copolymer (b) instead of the copolymer (a) The results are shown in Table 1.

Example 6
Preparation of Composite Crosslinked Film of Copolymer (c) and TEOS, P and Sn Added A film was prepared in the same manner as in Example 3 except for using the copolymer (c) instead of the copolymer (a) The results are shown in Table 1.

Comparative Example 1
Preparation of Crosslinked Film of Copolymer (a), P and Sn Not Added A film was prepared in the same manner as in Example 1 except that tributoxy phosphite was not added. The film was not crosslinked at all under these conditions. The results are shown in Table 1.

Comparative Example 2
Preparation of Crosslinked Film of Copolymer (a), P Not Added, Sn Added A film was prepared in the same manner as in Example 1 except for adding dioctyltin (II) instead of tributoxy phosphite. The film was crosslinked to only a small extent under these conditions. The results are shown in Table 1.

Comparative Example 3
Preparation of Crosslinked Film of Copolymer (a), P and Sn Added, Treated in Hot Water at 40° C.

A film was prepared in the same manner as in Example 1 except for heating the film in hot water at 40° C. instead of vapor at 150° C. The film was not crosslinked at all under these conditions. The results are shown in Table 1.

Comparative Example 4
Preparation of Composite Crosslinked Film of Copolymer (a) and TEOS, P Not Added, Sn Added A film was prepared in the same manner as in Example 2 except that tributoxy phosphite was not added. The film was crosslinked to only a small extent under these conditions. The results are shown in Table 1.

TABLE 1

| | | Example | | | | | | Comparative Example | | | |
|---|---|---|---|---|---|---|---|---|---|---|---|
| | | 1 | 2 | 3 | 4 | 5 | 6 | 1 | 2 | 3 | 4 |
| Copolymer | | a | a | a | a | b | c | a | a | a | a |
| Additional compound | | None | None | TEOS | TEOS | TEOS | TEOS | None | None | None | TEOS |
| $H_2O$ treatment (° C.) | | 150 | 150 | 150 | 150 | 150 | 150 | 150 | 150 | 40 | 150 |
| Phosphite catalyst | | Added | Added | Added | Added | Added | Added | None | None | Added | None |
| Sn catalyst | | None | Added | Added | None | Added | Added | None | Added | Added | Added |
| Degree of swelling in toluene (%) | | 200 | 200 | 160 | 180 | 190 | 200 | Dissolved | 500 | Dissolved | 480 |
| Tg (° C.) | | 345 | 338 | 340 | 340 | 340 | 340 | 340 | 338 | 338 | 338 |
| Total light transmittance (%) | | 91 | 91 | 91 | 85 | 91 | 91 | 91 | 91 | 91 | 91 |
| Coefficient of linear expansion (ppm/° C.) | | 58 | 54 | 48 | 50 | 52 | 49 | 88 | 81 | 88 | 75 |
| Liquid crystal resistance test | | ⊚ | ⊚ | ⊚ | ⊚ | ⊚ | ⊚ | X | X | X | X |
| Adhesion (number of peeled blocks) | Al deposited film | 0 | 0 | 0 | 0 | 0 | 0 | 4 | 3 | 4 | 3 |
| | Quartz glass | 0 | 0 | 0 | 0 | 0 | 0 | 22 | 21 | 20 | 18 |

Example 7
Preparation of Film for Liquid Crystal Display Device and Liquid Crystal Substrate Film:

Variation in retardation of the crosslinked film prepared in Example 3 was ±5% at a wavelength of 633 nm. An anchor agent solution of a high-molecular-weight ionic complex ("Toyobine 210K" manufactured by Tosoh Corp.) containing water/alcohol (weight ratio: 50/50) as a solvent component was applied to the crosslinked film prepared in Example 3, and dried at 90° C. for five minutes to form an aqueous anchor coat layer. An adhesive layer containing a urethane-based adhesive ("Takelac A-371" manufactured by Takeda Chemical Industries, Ltd.) and a curing agent ("Takenate A-10" manufactured by Takeda Chemical Industries, Ltd.) was formed on the aqueous anchor coat layer. An ethylene-vinyl alcohol copolymer/dichromatic dye-based polarizing film was layered on the adhesive layer, and pressed at a temperature of 80° C. and a pressure of 3 kg/cm$^2$ to form an integrated film. A transparent conductive layer was formed on the surface of the polarizing film by using a sputtering method utilizing a target consisting of indium oxide/tin oxide (weight ratio: 95:5). A liquid crystal display panel having a layer structure consisting of the transparent electrode/polarizing film/adhesive layer/aqueous anchor coat layer/substrate layer was thus obtained. The substrate layer and the polarizing film of the laminate exhibited good adhesion and no delamination was observed. The laminate was subjected to a durability test at a temperature of 80° C. and a relative humidity of 90%. As a result, the laminate showed no abnormalities after 1000 hours of testing and exhibited high durability.

Example 8
Preparation of Surface Protective Film:

1 part by weight of stearyl-β-(3,5-di-t-butyl-4-hydroxyphenyl)propionate and 0.1 part by weight of tris(2,4-di-t-butylphenyl)phosphite were added to the mixed solution prepared in Example 3 so that the total amount was 100 parts by weight. A film with a thickness of 80 μm was formed by a casting method to obtain a surface protective film. The glass transition temperature of the film was 340° C. Variation in retardation of the film was as small as ±5% at a wavelength of 633 nm.

Example 9
Preparation of Polarizing Film:

A polyvinyl alcohol film with a thickness of 50 μm was uniaxially stretched to four times the initial value for about five minutes while immersing the film in a bath at 40° C. containing 5.0 g of iodine, 250 g of potassium iodide, 10 g of boric acid, and 1,000 g of water. The surface of the resulting film was washed with alcohol and air-dried while maintaining tension to obtain a polarizing film. The above protective film was layered onto the polarizing film made of polyvinyl alcohol by using a tackifier prepared by mixing 100 parts by weight of an acrylic resin containing 90 wt % of n-butyl acrylate, 7 wt % of ethyl acrylate, and 3 wt % of acrylic acid with a crosslinking agent containing 2 parts by weight of 75 wt % ethyl acetate solution of a trimethylolpropane (1 mol) addition product of tolylene diisocyanate (3 mol). Adhesion between these layers was good and no delamination was observed. The laminate was subjected to a durability test at a temperature of 80° C. and a relative humidity of 90%. As a result, the polarizing film showed no abnormality after 1000 hours of testing and exhibited high durability.

Example 10
Preparation of Retardation Film

A film with a thickness of 100 μm was prepared by using the mixed solution prepared in Example 3 by a casting method. The film was uniaxially stretched at a temperature of 300° C. to obtain a retardation film with a thickness of 80 μm. The retardation of the film at a wavelength of 633 nm was 136 μm. Variation in retardation of the film was as small as ±5%. The wavelength dispersibility (α) of the retardation at a wavelength of 450 to 750 nm was 1.01.

Example 11
Preparation of Transparent Conductive Film:

A film with a length of 200 mm, a width of 200 mm, and a thickness of 0.1 mm was prepared by using the technique of Example 3. An indium-tin oxide (ITO) film was formed on the resulting film using sputtering equipment (manufactured by Chugai Ro Co., Ltd.) under the following conditions.

Power supply: MHz high frequency power supply
Substrate temperature: 70° C.
Target: alloy of $In_2O_3/SnO_2$=90/10 (weight ratio)
Atmosphere: under reflux of argon gas
Sputtering rate: 270 angstrom/min.
Sputtering pressure: $10^{-2}$ Torr The resulting ITO film had a thickness of 2,500 angstrom units and a specific resistivity of $1.5 \times 10^{-3}$ ohm cm. Light transmittance of this transparent conductive composite material at 400–800 nm was 84%. Adhesion between the transparent conductive composite material and the ITO film was measured according to JIS K5400 (8,5,2 cross-cut test). As a result, no delamination was observed. The transparent conductive composite material did not show changes in conductivity and appearance after being allowed to stand at a temperature of 90° C. and a humidity of 95% for one week.

Example 12
Preparation of EL Display Device

A quinolinol complex solution was applied to a glass substrate (5 cm×5 cm) on which an ITO film was formed. The solvent was then removed to form an electroluminescent layer with a thickness of 50 nm. An electron transport light emitting layer with a thickness of 60 nm was formed of trisquinolinolate aluminum on the electroluminescent layer. A magnesium/silver alloy (weight ratio: 10:1) film (cathode layer) with a length of 5 mm, a width of 5 mm, and a thickness of 100 nm was formed on the electron transport light emitting layer by using a vacuum deposition method. A laminate consisting of the above retardation film and a commercially available polarizing film ("NPF-F1225DU" manufactured by NittoDenko Co., Ltd.) was provided on the side of the glass substrate opposite to the side on which the ITO film was formed to obtain an EL display device.

The evaluation results for the EL display device thus obtained are as follows. Color tone: black, quality: no reflection of external scene, light reflectance (%): 0.2, adhesion: no delamination, durability under high temperature and high humidity conditions: no abnormality. The EL display device using the retardation film of the present invention was capable of preventing reflection of the external scene by shading reflected light from the back electrode, whereby an EL display device capable of displaying a clear screen even in a lighted location was obtained.

Example 13
Preparation of Light Diffusion Composite Sheet

A film with a thickness of 0.1 mm was prepared by using the technique of Example 3. A solution of 10 g of a vinyl chloride-vinyl acetate copolymer containing methyl ethyl ketone/ethylene glycol (weight ratio: 40/0.1) as a solvent component was applied to the film and dried to form a resin film with a thickness of 30 μm. The film was immersed in hot water at 80° C. for 45 minutes. The film was then removed from the hot water and dried to obtain a light diffusion composite sheet with a thickness of 130 μm. The light transmittance of the transparent resin film was 75%. The particle diameter was 2 to 8 μm (individual bubbles).

Example 14

Preparation of Antireflection Film

A film with a thickness of 100 μm was formed by using the mixed solution prepared in Example 3 by a casting method. $SiO_2$ was deposited on the surface of the film to a thickness of 825 nm under vacuum at $10^{-4}$ Torr. $SiO_2$ was deposited to a thickness of 130 nm. A mixture of $ZrO_2$ and $TiO_2$ was deposited to a thickness of 130 nm. $SiO_2$ was then deposited to a thickness of 248 nm as the outermost layer to obtain an antireflection film. The light transmittance of the antireflection film was 90%. The birefringence of the antireflection film was as small as 2 nm.

Obviously, numerous modifications and variations of the present invention are possible in light of the above teachings. It is therefore to be understood that, within the scope of the appended claims, the invention may be practiced otherwise than as specifically described herein.

What is claimed is:

1. A resin film, obtained by forming a composition comprising:

(I) a cyclic olefin addition copolymer which comprises a repeating unit (a) shown by the following formula (1),

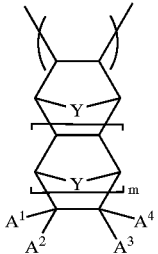

(1)

wherein $A^1$ to $A^4$ individually represent a hydrogen atom, a hydrocarbon group having 1–20 carbon atoms, or an alkoxysilyl group or an aryloxysilyl group shown by $(CR^1R^2)_f Si(OR^3)_g R^4_{(3-g)}$, $—(CR^1R^2)_f Si(R^3R^4)OSi(OR^3)_g R^4_{(3-g)}$, or $—(CR^1R^2)_f C(O)O(CH_2)_h Si(OR^3)_g R^4_{(3-g)}$, -(wherein $R^1$ and $R^2$ individually represent a hydrogen atom or a hydrocarbon group having 1–20 carbon atoms, $R^3$ represents an alkyl group, alkenyl group, aryl group, or cycloalkyl group, each having 1–10 carbon atoms, $R^4$ is a hydrogen atom, a halogen atom, or a hydrocarbon group having 1–20 carbon atoms, f and h are integers of 0–5, and g is an integer of 1–3), provided that at least one of $A^1$ to $A^4$ represents the alkoxysilyl group or aryloxysilyl group, Y represents —$CH_2$— or —O—, and m is either 0 or 1, and a repeating unit (b) shown by the following formula (2),

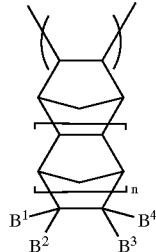

(2)

wherein $B^1$ to $B^4$ individually represent a hydrogen atom, an alkyl group, aryl group, alkenyl group, or cycloalkyl group, each having 1–20 carbon atoms, a halogen atom, a halogenated hydrocarbon group, or a polar group shown by —$(CH_2)_j X$, -(wherein X represents —C(O)OR$^5$ or —OC(O)R$^6$, -(wherein $R^5$ and $R^6$ represent an alkyl group, alkenyl group, aryl group, cycloalkyl group, each having 1–20 carbon atoms, or a halogen-substituted group of these groups), and j is an integer of 0–5), $B^1$ and $B^2$ or $B^3$ and $B^4$ may form an alkylidenyl group, $B^1$ and $B^4$, $B^1$ and $B^3$, or $B^2$ and $B^4$ may form a cycloalkylene group or a cycloalkenylene group, and n is an integer of 0–2, wherein the composition further comprises at least one of, (II) at least one compound selected from the group consisting of an organosilane shown by the following formula (3), a hydrolyzate of the organosilane, and a condensation product of the organosilane, $$(R^7)_p Si(OR^8)_{4-p}$$ (3)

wherein $R^7$ individually represents an organic group having 1–10 carbon atoms, $R^8$ individually represents an alkyl group having 1–5 carbon atoms or an acyl group having 1–6 carbon atoms, and p is an integer of 0–2; and (III) at least one metal oxide selected from the group consisting of silica, alumina, zirconia, and titania.

2. The resin film according to claim 1, wherein the composition further comprises at least one compound of a metal selected from the group consisting of Al, Zr, Sn, Zn, Ca, Ba, Ti, Sc, Gd, Yb, Sm, Nd, Sb, Y, and Ce as a catalyst.

3. The resin film according to claim 1, which is obtained by a process comprising mixing the composition with an organic solvent to prepare a solution, and forming the solution into a film by using a solution casting method.

4. The resin film according to claim 1, wherein the cyclic olefin addition copolymer is crosslinked through siloxane bonds.

5. A liquid crystal substrate film for a liquid crystal display device produced by using the resin film according to claim 1 or 4.

6. A polarizing film for a liquid crystal display device produced by using the resin film according to claim 1 or 4.

7. A surface protective film for a liquid crystal display device produced by using the resin film according to claim 1 or 4.

8. A retardation film for a liquid crystal display device produced by using the resin film according to claim 1 or 4.

9. A transparent conductive film for a liquid crystal display device produced by using the resin film according to claim 1 or 4.

10. A light diffusion film for a liquid crystal display device produced by using the resin film according to claim 1 or 4.

11. A film for an EL display device produced by using the resin film according to claim 1 or 4.

12. A transparent conductive composite material comprising the resin film according to claim 1 or 4, and a transparent conductive film formed on the surface of the resin film.

13. An antireflection film comprising the resin film according to claim 1 or 4, and an antireflection film formed on the surface of the resin film, wherein a layer in contact with the surface of the resin film is formed of $SiO_x$ ($0.8 \leq x \leq 1.8$), and an outermost layer is formed of $SiO_2$.

14. A liquid display, comprising: the resin film according to claim 4.

15. An EL display, comprising: the resin film according to claim 4.

16. A polarizing film, comprising:
the resin film according to claim 4 as a protective layer.

17. A surface protective film, comprising:
the resin film according to claim 4.

18. A retardation film, comprising:
the resin film according to claim 4 in stretched and oriented or in pressed form.

19. A transparent conductive film, comprising:
the resin film according to claim 1 or 4; and
a transparent conductive layer.

20. A light diffusion film, comprising:
the resin film according to claim 1 or 4 which has a pattern that diffuses light.

21. A process for producing a resin film, comprising:
a) mixing components (I), (II), and (III) with an organic solvent to prepare a solution
(I) a cyclic olefin addition copolymer which comprises a repeating unit (a) shown by the following formula (1),

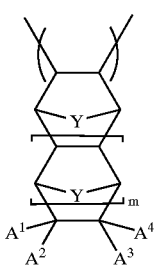

(1)

wherein $A^1$ to $A^4$ individually represent a hydrogen atom, a hydrocarbon group having 1–20 carbon atoms, or an alkoxysilyl group or an aryloxysilyl group shown by
—$(CR^1R^2)_f Si(OR^3)_g R^4_{(3-g)}$, —$(CR^1R^2)_f Si(R^3R4)OSi(OR^3)_g R^4_{(3-g)}$, or
—$(CR^1R^2)_f C(O)O(CH_2)_h Si(OR^3)_g R^4_{(3-g)}$, wherein $R^1$ and $R^2$ individually represent a hydrogen atom or a hydrocarbon group having 1–20 carbon atoms, $R^3$ represents an alkyl group, alkenyl group, aryl group, or cycloalkyl group, each having 1–10 carbon atoms, $R^4$ is a hydrogen atom, a halogen atom, or a hydrocarbon group having 1–20 carbon atoms, f and h are integers of 0–5, and g is an integer of 1–3,
provided that at least one of $A^1$ to $A^4$ represents the alkoxysilyl group or aryloxysilyl group, Y represents —$CH_2$— or —O—, and m is either 0 or 1, and a repeating unit (b) shown by the following formula (2),

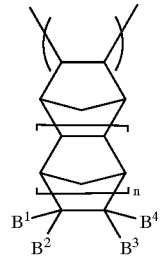

(2)

wherein $B^1$ to $B^4$ individually represent a hydrogen atom, an alkyl group, aryl group, alkenyl group, or cycloalkyl group, each having 1–20 carbon atoms, a halogen atom, a halogenated hydrocarbon group, or a polar group shown by —$(CH_2)_j X$, wherein X represents $C(O)OR^5$ or —$OC(O)R^6$, wherein $R^5$ and $R^6$ represent an alkyl group, alkenyl group, aryl group, cycloalkyl group, each having 1–20 carbon atoms, or a halogen-substituted group of these groups, and j is an integer of 0–5, $B^1$ and $B^2$ or $B^3$ and $B^4$ may form an alkylidenyl group, $B^1$ and $B^4$, $B^4$ and $B^3$, or $B^2$ and $B^4$ may form a cycloalkylene group or a cycloalkenylene group, and n is an integer of 0–2, (II) at least one compound selected from the group consisting of an organosilane shown by the following formula (3), a hydrolyzate of the organosilane, and a condensation product of the organosilane, $(R^7)_p Si(OR^8)_{4-p}$ (3)

wherein $R^7$ individually represents an organic group having 1–10 carbon atoms, $R^8$ individually represents an alkyl group having 1–5 carbon atoms or an acyl group having 1–6 carbon atoms, and p is an integer of 0–2: and (III) at least one metal oxide selected from the group consisting of silica, alumina, zirconia, and titania; and (b) forming the solution into a film by using a solution casting method.

22. The process according to claim 21, wherein the composition further comprises at least one compound of a metal selected from the group consisting of Al, Zr, Sn, Zn, Ca, Ba, Ti, Sc, Gd, Yb, Sm, Nd, Sb, Y, and Ce as a catalyst.

* * * * *

UNITED STATES PATENT AND TRADEMARK OFFICE
CERTIFICATE OF CORRECTION

PATENT NO. : 6,790,914 B2
DATED : September 14, 2004
INVENTOR(S) : Tarou Kanamori et al.

It is certified that error appears in the above-identified patent and that said Letters Patent is hereby corrected as shown below:

Column 32,
Line 32, "$B^4$ and $B^3$" should be -- $B^1$ and $B^3$ --.

Signed and Sealed this

First Day of February, 2005

JON W. DUDAS
*Director of the United States Patent and Trademark Office*